US010372378B1

(12) United States Patent
Benisty et al.

(10) Patent No.: US 10,372,378 B1
(45) Date of Patent: Aug. 6, 2019

(54) REPLACEMENT DATA BUFFER POINTERS

(71) Applicant: Western Digital Technologies, Inc., San Jose, CA (US)

(72) Inventors: Shay Benisty, Beer Sheva (IL); Judah Gamliel Hahn, Ofra (IL); Alon Marcu, Tel-Mond (IL); Ariel Navon, Revava (IL); Alexander Bazarsky, Holon (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/897,760

(22) Filed: Feb. 15, 2018

(51) Int. Cl.
*G06F 3/06* (2006.01)

(52) U.S. Cl.
CPC .......... *G06F 3/0659* (2013.01); *G06F 3/0611* (2013.01); *G06F 3/0632* (2013.01); *G06F 3/0656* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 5,991,825 A * | 11/1999 | Ng | ......................... | G06F 3/0611 710/39 |
| 6,055,579 A * | 4/2000 | Goyal | ................... | G06F 9/4881 712/28 |
| 6,323,867 B1 * | 11/2001 | Nookala | ............... | G06F 9/3879 345/522 |
| 6,330,628 B1 * | 12/2001 | Motoyama | ................ | G06F 3/12 358/1.15 |
| 6,487,639 B1 * | 11/2002 | Lipasti | .................... | G06F 9/383 711/119 |
| 6,745,283 B1 | 6/2004 | Dang | | |
| 7,334,091 B1 * | 2/2008 | Mizrahi | .................... | G06F 5/06 710/52 |
| 7,487,271 B2 * | 2/2009 | Khawand | .............. | G06F 9/5016 710/52 |
| 7,865,638 B1 * | 1/2011 | Wyatt | ................. | G06F 12/0284 710/52 |

(Continued)

OTHER PUBLICATIONS

NVM Express, "NVM Express," Revision 1.3a, Oct. 24, 2017, 287 pages.

*Primary Examiner* — Midys Rojas
*Assistant Examiner* — Khoa D Doan
(74) *Attorney, Agent, or Firm* — Vierra Magen Marcus LLP

(57) ABSTRACT

Technology is described herein for operating non-volatile storage. In one aspect, a memory controller replaces an original data buffer pointer(s) to a host memory data buffer(s) with a replacement data buffer pointer(s) to a different data buffer(s) in the host memory. The original data buffer pointer(s) may be associated with a specific read command. For example, the original data buffer pointer(s) may point to data buffer(s) to which data for some range of logical addresses (which may be read from the non-volatile storage) is to be transferred by a memory controller of the non-volatile storage. The replacement data buffer pointer(s) could be associated with a different read command. However, it is not required for the replacement data buffer pointer(s) to be associated with a read command. The replacement data buffer pointer(s) may point to a region of memory that is allocated for exclusive use of the memory controller.

23 Claims, 14 Drawing Sheets

(56) References Cited

U.S. PATENT DOCUMENTS

| | | | |
|---|---|---|---|
| 8,897,573 B2* | 11/2014 | Chen | G06F 9/45558 |
| | | | 382/195 |
| 9,128,615 B2* | 9/2015 | Benisty | G06F 3/0659 |
| 9,229,870 B1* | 1/2016 | Kumar | G06F 12/0868 |
| 9,317,209 B2* | 4/2016 | Kirshenbaum | G06F 12/0866 |
| 9,563,382 B2 | 2/2017 | Hahn et al. | |
| 10,048,875 B2* | 8/2018 | Phan | G06F 12/0246 |
| 10,114,586 B1* | 10/2018 | Benisty | G06F 3/0656 |
| 10,228,869 B1* | 3/2019 | Nakibly | G06F 3/0617 |
| 10,235,102 B2* | 3/2019 | Richter | G06F 3/0679 |
| 2001/0028353 A1* | 10/2001 | Cheng | G06F 3/14 |
| | | | 345/531 |
| 2002/0138700 A1* | 9/2002 | Holmberg | G06F 9/3802 |
| | | | 711/137 |
| 2003/0084261 A1* | 5/2003 | Byrd | G06F 3/061 |
| | | | 711/167 |
| 2006/0161700 A1* | 7/2006 | Boyd | G06F 11/2069 |
| | | | 710/61 |
| 2012/0166685 A1* | 6/2012 | Booth | G06F 13/24 |
| | | | 710/48 |
| 2015/0186068 A1* | 7/2015 | Benisty | G06F 3/0673 |
| | | | 711/154 |
| 2015/0356020 A1 | 12/2015 | Desai et al. | |
| 2016/0246726 A1 | 8/2016 | Hahn | |
| 2017/0102879 A1 | 4/2017 | Benisty et al. | |
| 2017/0123721 A1* | 5/2017 | Sela | G06F 3/0611 |
| 2017/0285940 A1 | 10/2017 | Benisty et al. | |
| 2018/0190365 A1* | 7/2018 | Luck | G11C 29/38 |

* cited by examiner

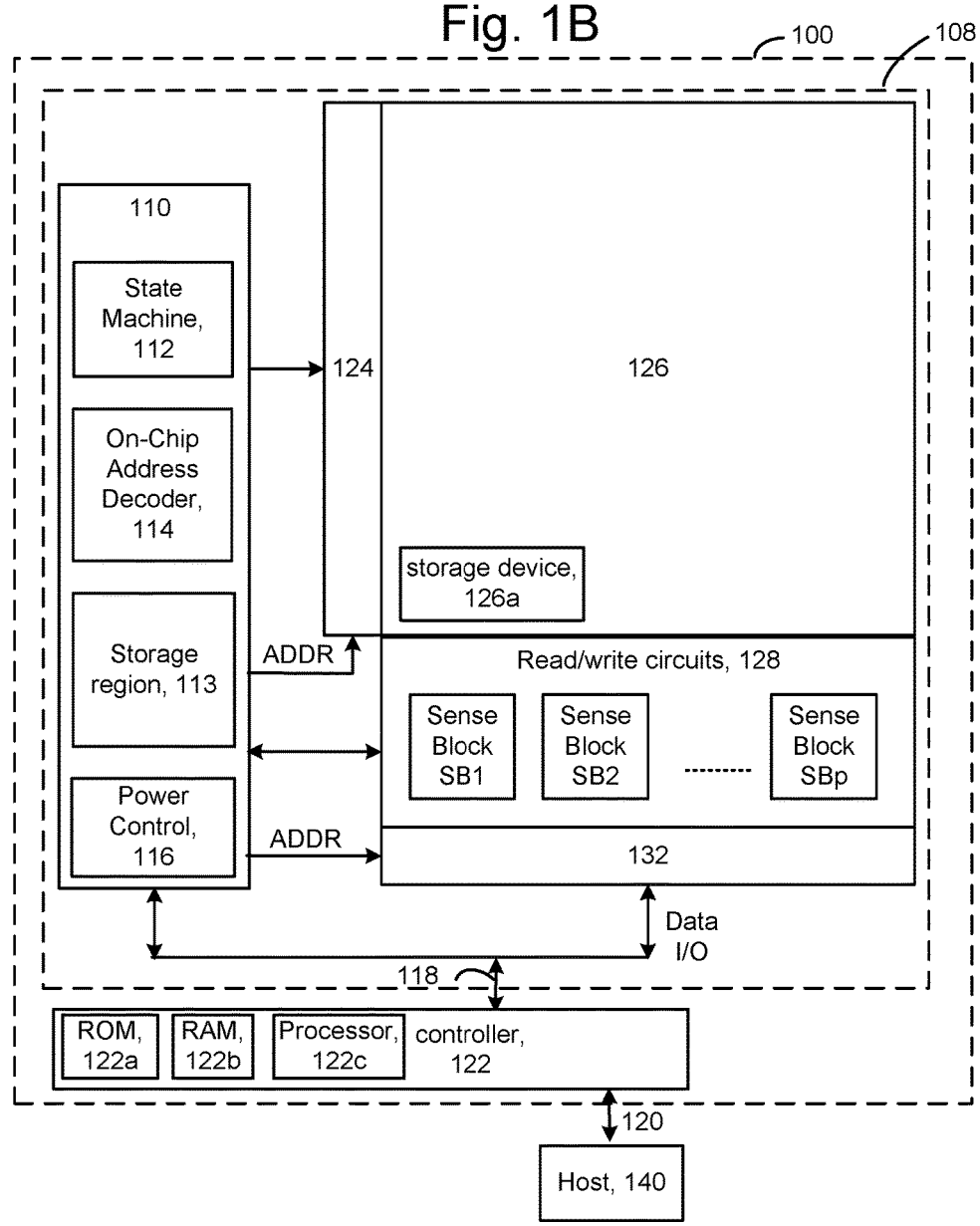

REPLACEMENT DATA BUFFER POINTERS

BACKGROUND

The present disclosure relates to technology for non-volatile storage.

One type of non-volatile storage is semiconductor memory. For example, non-volatile semiconductor memory is used in solid state drives, mobile computing devices, non-mobile computing devices and other non-volatile memory systems. Typically, the non-volatile memory device has a memory controller which controls data transfers between the non-volatile memory device and a host system over a communication interface. The host system could be computer system, cellular telephone, server, etc. The non-volatile memory device and host system may exchange data over, for example, a Peripheral Computer Interface Express (PCIe) bus. Non-volatile Memory Express (NVMe) is a logical device interface specification for accessing non-volatile storage attached via a PCIe bus. NVMe takes advantage of parallelism offered by semiconductor memory such as, but not limited to, solid state drives.

The host system may have data buffers that are used to store data to be written to the non-volatile memory device, as well as to store data read from the non-volatile memory device. The host system may make data buffer pointers to the data buffers available to the memory controller. Thus, the memory controller may use the data buffer pointers to access data to be written to the non-volatile memory device, as well as to transfer data that is read from the non-volatile memory device into the data buffers.

BRIEF DESCRIPTION OF THE DRAWINGS

FIG. 1B is a functional block diagram of a memory device such as the 3D stacked non-volatile memory device of FIG. 1A.

DETAILED DESCRIPTION

Figure 1A:
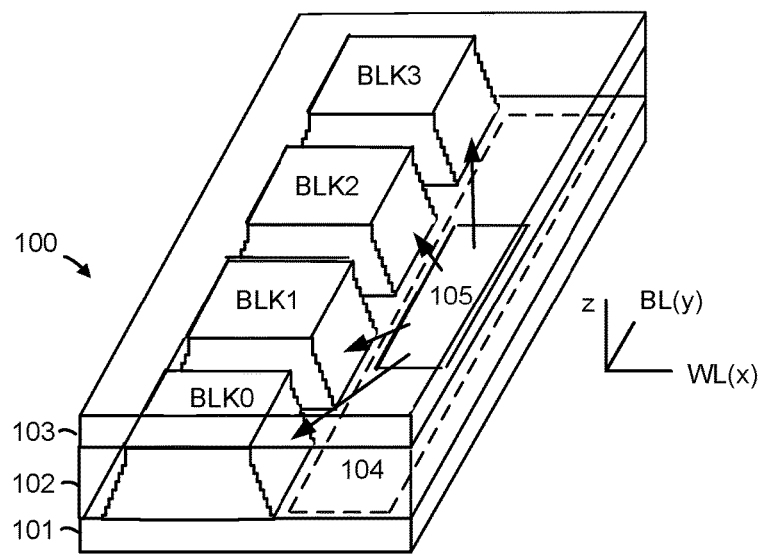
FIG. 1A is a perspective view of a set of blocks in a 3D stacked non-volatile memory device.

Technology is described herein for operating non-volatile storage. One embodiment is a non-volatile memory device that manages data buffer pointers to data buffers in host memory. Note that, in some memory access protocols (e.g., NVMe), data buffer pointers to data buffers in host memory may be generated by and managed by the host system. Furthermore, the non-volatile memory device is not allowed to change the data buffer pointers in some memory access protocols. One embodiment is a non-volatile memory device that replaces an original data buffer pointer (or pointers) to a host memory data buffer (or buffers) with a replacement data buffer pointer (or pointers) to a different data buffer (or buffers) in the host memory. Such data buffer pointer replacement can save time and power when responding to memory access requests.

The original data buffer pointer(s) may be associated with a specific read command. For example, the original data buffer pointer(s) may point to data buffer(s) to which data for some range of logical addresses (which may be read from the non-volatile storage) is to be transferred by a memory controller of the non-volatile storage. The replacement data buffer pointer(s) could be associated with a different read command. However, it is not required for the replacement data buffer pointer(s) to be associated with a read command. In one embodiment, the replacement data buffer pointer(s) point to a region of host memory that is allocated for exclusive use of the memory controller.

In some cases, the data needed to respond to the specific read command may already be cached in the host memory. Replacing the original data buffer pointers associated with the specific command with replacement data buffer pointers to the data already cached in host memory is a very efficient way to respond to the specific read command. In one embodiment, the data is cached in a region of the host memory that is dedicated for the exclusive use of a memory controller of the non-volatile memory device. For example, the data might be cached in an NVMe Host Memory Buffer (HMB) region of host memory that is allocated for the memory controller's exclusive use. Replacing the data buffer pointers is more efficient than reading the needed data from the non-volatile storage, and sending the data across the (e.g., PCIe) bus from the non-volatile memory device to data buffers associated with the specific read command. Thus, replacing the data buffer pointers can save time and energy. Replacing the original data buffer pointers is more efficient than copying the cached data from the host over a bus to the non-volatile memory device, and then back across the bus to the data buffers associated with the specific read command. Therefore, replacing the data buffer pointers can also reduce traffic over the (e.g., PCIe) bus.

In some cases, the data needed to respond to a read command is already cached in the non-volatile memory device. However, the memory controller has not yet obtained the data buffer pointers to the data buffers to which the memory controller is to transfer the data. Replacing the original data buffers pointers for this read command with replacement data buffer pointer can save time in responding to the read command. Note that the original data buffer pointers to the data buffers in the host memory are not necessarily included in the specified read command. Rather, the memory controller may need to fetch the original data buffer pointers separately from fetching the read command. In one embodiment, the memory controller uses data buffer pointers that it has already fetched for another read command to replace the original data buffer pointers associated with the specified read command. For example, the data needed to satisfy the specified read command may already be cached in Random Access Memory (RAM) on non-volatile memory device. However, the original data buffer pointers to the host memory buffers have not yet been fetched, in this example. Moreover, the memory controller could have some other data buffer pointers to other data buffers in the host memory that it cannot use at the time. For example, these other data buffer pointers might be for a read command that is waiting to be executed in the non-volatile memory device. Rather than delay the data transfer of the already cached data (for the specified read command) to the host memory, the memory controller may transfer the cached data to other data buffers that were to be used for the other read command waiting to be executed. Thus, the cached data can be transferred earlier. The memory controller may fetch the original data buffer pointers for the specified read command in time to use them for the other read command that is waiting to be executed (or another read command).

In some cases, the first data buffer pointer provided by the host may contain an offset while all other data buffers must be aligned to, for example, a multiple of 4 KB. The fact that the first data buffer pointer has an offset complicates the data-transfer operation since host and internal non-volatile memory device buffers may be unaligned for the entire transfer. Replacing the original data buffer pointers with replacement data buffer pointers can simplify the data transfer by causing the host and non-volatile memory device buffers to be aligned.

There are many other possible uses of replacing the one or more data buffer pointers associated with a read command with another set of one or more data buffer pointers. Note that replacing the original data buffer pointers with replacement data buffer pointers may have the effect of swapping the original data buffers with replacement data buffers that are pointed to by the replacement data buffer pointers.

In some embodiments, at least the original data buffer pointers are NVMe Physical Region Page (PRP) entries in a PRP list, which may reside in memory of a host system connected to the non-volatile memory device. The replacement data buffer pointers could be NVMe PRP entries. The replacement data buffer pointers could be from a descriptor list that the host used to point to an NVMe HMB. Note that data buffer pointers are not limited to NVMe. Hence, embodiments of non-volatile memory devices may operate with memory access protocols other than NVMe.

Technology described herein may be used with a variety of types of non-volatile memory. One example is a three-dimensional (3D) non-volatile memory device. However, embodiments may also be practiced in two-dimensional (2D) non-volatile memory device. FIG. 1A is a perspective view of a set of blocks in a 3D stacked non-volatile memory device 100. The non-volatile memory device 100 includes a substrate 101. On the substrate are example blocks BLK0, BLK1, BLK2 and BLK3 of memory cells (storage elements) and a peripheral area 104 with circuitry for use by the blocks. For example, the circuitry can include voltage drivers 105 which can be connected to control gate layers of the blocks. In one approach, control gate layers at a common height in the blocks are commonly driven. The substrate 101 can also carry circuitry under the blocks, along with one or more lower metal layers which are patterned in conductive paths to carry signals of the circuitry. The blocks are formed in an intermediate region 102 of the memory device. In an upper region 103 of the memory system, one or more upper metal layers are patterned in conductive paths to carry signals of the circuitry. Each block comprises a stacked area of memory cells, where alternating levels of the stack represent control gate layers. In one possible approach, the control gate layers of each block at a common height are connected to one another and to a voltage driver. While four blocks are depicted as an example, two or more blocks can be used, extending in the x- and/or y-directions.

The length of the plane, in the x-direction, may represent a direction in which signal paths to word lines extend in the one or more upper metal layers (e.g., a word line or drain side select gate (SGD) line direction), and the width of the plane, in the y-direction, represents a direction in which signal paths to bit lines extend in the one or more upper metal layers (e.g., a bit line direction). The z-direction represents a height of the memory device.

FIG. 1B is a functional block diagram of a non-volatile memory device such as the 3D stacked non-volatile memory device 100 of FIG. 1A. The functional block diagram may also be used for a 2D non-volatile memory device. The non-volatile memory device 100 may include one or more memory die 108. The set of blocks of FIG. 1A can be on one die. The memory die 108 includes a memory structure 126 of memory cells, such as an array of memory cells, control circuitry 110, and read/write circuits 128. In a 3D configuration, the memory structure can include the blocks of FIG. 1A. The memory structure 126 is addressable by word lines via a row decoder 124 and by bit lines via a column decoder 132. The read/write circuits 128 include multiple sense blocks SB1, SB2, . . . , SBp (sensing circuitry) and allow a page of memory cells to be read or programmed in parallel. Typically a memory controller 122 is included in the same non-volatile memory device 100 (e.g., a removable storage card) as the one or more memory die 108. Commands and data are transferred between the host system 140 and memory controller 122 via an interface (e.g., data bus) 120 and between the memory controller and the one or more memory die 108 via lines 118. The host system 140 may send memory access commands to access the memory structure 126, and hence may be referred to as a requestor.

Multiple memory elements in memory structure 126 may be configured so that they are connected in series or so that each element is individually accessible. By way of non-limiting example, flash memory systems in a NAND configuration (NAND memory) typically contain memory elements connected in series. A NAND string is an example of a set of series-connected transistors comprising memory cells and select gate transistors.

A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

Other types of non-volatile memory in addition to NAND flash memory can also be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), phase change memory (e.g., PCRAM), and other semiconductor elements capable of storing information. Each type of memory device may have different configurations. For example, flash memory devices may be configured in a NAND or a NOR configuration.

The memory elements can be formed from passive and/or active elements, in any combination. By way of non-limiting example, passive semiconductor memory elements include ReRAM device elements, which in some embodiments include a resistivity switching storage element, such as an anti-fuse or phase change material, and optionally a steering element, such as a diode or transistor. The phase change material may include a chalcogenide material. Further by way of non-limiting example, active semiconductor memory elements include EEPROM and flash memory device elements, which in some embodiments include elements containing a charge storage region, such as a floating gate, conductive nanoparticles, or a charge storage dielectric material.

The memory structure 126 can be two-dimensional (2D) or three-dimensional (3D). The memory structure 126 may comprise one or more arrays of memory elements (also referred to as memory cells). In a two-dimensional memory structure, the semiconductor memory elements are arranged in a single plane or a single memory device level. Typically, in a two-dimensional memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

A three-dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate).

The memory structure may comprise a monolithic three-dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements. The columns may be arranged in a two-dimensional configuration, e.g., in an x-y plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-y) memory device level. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three dimensional memory arrays (monolithic or non-monolithic) may be formed on separate chips and then packaged together to form a stacked-chip memory device.

One of skill in the art will recognize that this technology is not limited to the two dimensional and three dimensional exemplary structures described but covers all relevant memory structures within the spirit and scope of the technology as described herein and as understood by one of skill in the art.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a memory controller for memory read-write operations may be located on a separate controller chip and/or on the same substrate as the memory elements.

The control circuitry 110 cooperates with the read/write circuits 128 to perform memory operations on the memory structure 126, and includes a state machine 112, an on-chip address decoder 114, and a power control module 116. The state machine 112 provides chip-level control of memory operations. A storage region 113 may be provided for parameters for operating the memory device such as programming parameters for different rows or other groups of memory cells. These programming parameters could include bit line voltages and verify voltages.

The on-chip address decoder 114 provides an address interface between that used by the host or a memory controller to the hardware address used by the decoders 124 and 132. The power control module 116 controls the power and voltages supplied to the word lines and bit lines during memory operations. It can include drivers for word line layers (WLLs) in a 3D configuration, SGS and SGD select gates and source lines. The sense blocks can include bit line drivers, in one approach. A source side select gate (SGS) is a gate transistor at a source-end of a NAND string, and a drain side select gate (SGD) is a transistor at a drain-end of a NAND string.

In some implementations, some of the components can be combined. In various designs, one or more of the components (alone or in combination), other than memory structure 126, can be thought of as one or more control circuits which are configured to perform the actions described herein. For example, one or more control circuits may include any one of, or a combination of, control circuitry 110, state machine 112, decoders 114/124/132, power control module 116, sense blocks SB1, SB2, . . . , SBp, read/write circuits 128, memory controller 122, processor 122c, and so forth.

The memory controller 122 may comprise a processor 122c and storage devices (memory) such as read only memory (ROM) 122a and RAM 122b. RAM 122b may be, but is not limited to, SRAM and DRAM. The storage devices comprise code such as a set of instructions, and the processor is operable to execute the set of instructions to provide the functionality described herein. Alternatively or additionally, the processor can access code from a storage device region 126a of the memory structure, such as a reserved area of memory cells in one or more word lines.

The code is used by the memory controller 122 to access the memory structure 126 such as for programming, read and erase operations. The code can include boot code and control code (e.g., a set of instructions). The boot code is software that initializes the memory controller during a booting or startup process and enables the memory controller to access the memory structure. The code can be used by the memory controller to control one or more memory structures. Upon being powered up, the processor 122c fetches the boot code from the ROM 122a or storage device region 126a for execution, and the boot code initializes the system components and loads the control code into the RAM 122b. Once the control code is loaded into the RAM 122b, it is executed by the processor 122c. The control code includes drivers to perform basic tasks such as controlling and allocating memory, prioritizing the processing of instructions, and controlling input and output ports.

Figure 2A:
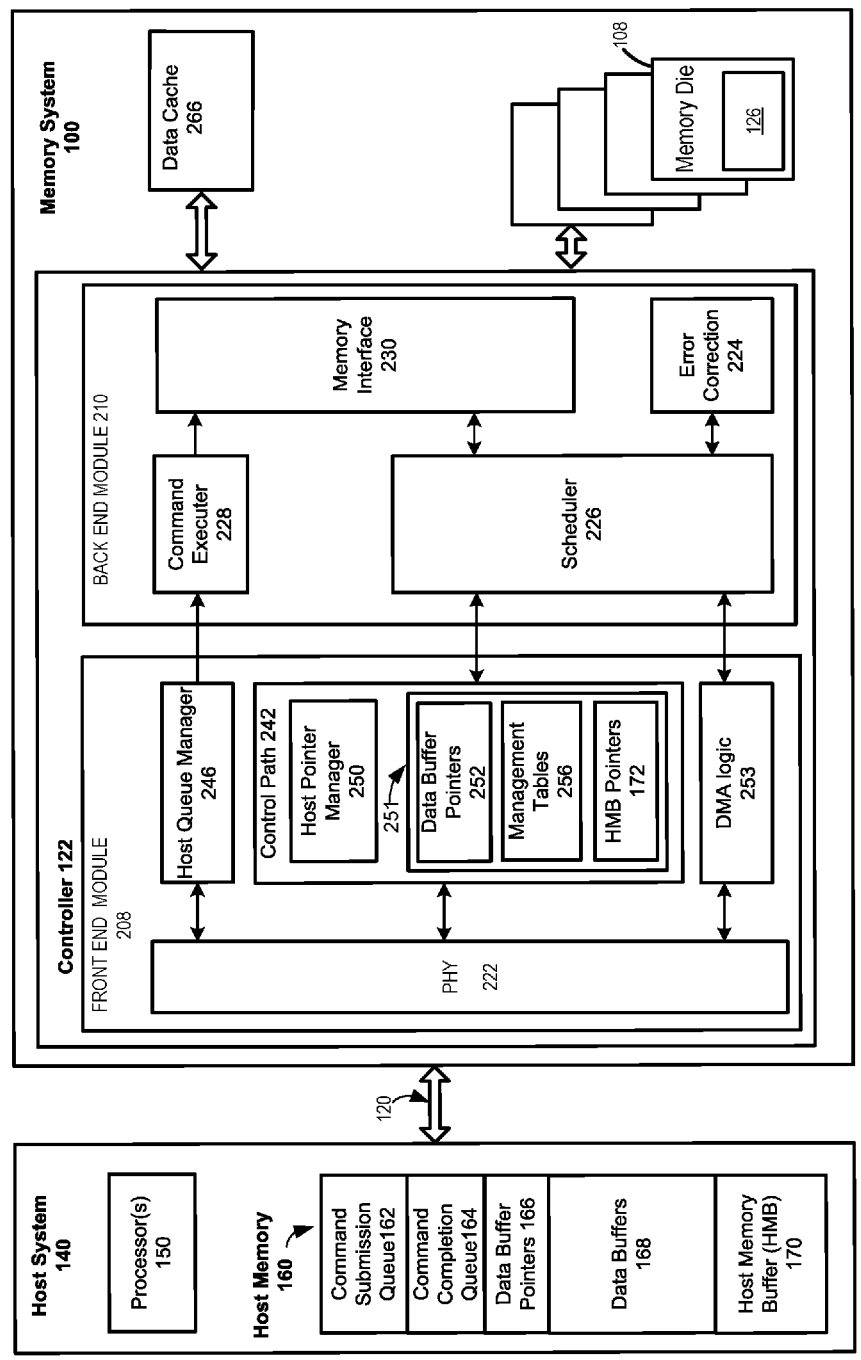
FIG. 2A is a block diagram of one embodiment of a non-volatile memory device and host, depicting more details of memory controller and host system.

FIG. 2A is a block diagram of example non-volatile memory device 100, depicting more details of one embodiment of a memory controller 122 and host system 140. In one embodiment, the system of FIG. 2A is a solid state drive. As used herein, a memory controller is a device that manages data stored on a non-volatile memory device and communicates with a host system, such as a computer or electronic device. In some embodiments, the memory die 108 contains flash (e.g., NAND, NOR) memory cells, in which case the memory controller 122 may be a flash memory controller. A memory controller can have various functionality in addition to the specific functionality described herein. For example, the memory controller can format the memory to ensure the memory is operating properly, map out bad memory cells, and allocate spare memory cells to be substituted for future failed cells. Some part of the spare cells can be used to hold firmware to operate the memory controller and implement other features. In operation, when a host needs to read data from or write data to the memory, it will communicate with the memory controller. If the host provides a logical address (LA) to which data is to be read/written, the memory controller can convert the logical address received from the host to a physical address in the memory. The logical address may be a logical block address (LBA), and the physical address may be a physical block address (PBA). (Alternatively, the host can provide the physical address). The memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The host system 140 has one or more processor(s) 150 and host memory 160. In one embodiment, host memory 160 includes command submission queues (SQs) 162 and command completion queues (CQs) 164. Commands to access the memory structure 126 in the memory die 108 may be placed by the host into a command submission queue 162. For example, a command might be to read from or write to the memory structure 126. Note that a command to read from the memory structure 126 might be responded to without a physical read of the memory structure 126 at that time if there a cached version of the data somewhere (such as in data cache 266 or HMB 170). In one embodiment, a command submission queue 162 is a circular buffer with a fixed size slot. In one embodiment, the host informs the non-volatile memory device when a new command has been placed on a command submission queue 162. One such mechanism is referred to herein as a "doorbell."

The memory controller 122 may write to an associated command completion queue 164 to post status for completed commands. In one embodiment, a command completion queue 164 is a circular buffer with a fixed size slot. The term "queue," as used herein (including, but not limited to SQ 162 and CQ 164) means non-transitory storage containing a data structure. The non-transitory storage could be, for example, RAM 122b, memory structure 126, etc.

Data buffers 168 may be used to store data to be written to the memory structure 126 or to store data that was read from the memory structure 126. The memory controller 122 may perform a Direct Memory Access (DMA) of data from data buffers 168, as a part of writing data to the memory structure 126. For example, the memory controller 122 may transfer write data from data buffers 168 to write buffers in the non-volatile memory device 100. The memory controller 122 may perform a DMA of data to data buffers 168, as a part of reading data from the memory structure 126. For example, the memory controller 122 may transfer read data from read buffers in the non-volatile memory device 100 to data buffers 168.

The host memory 160 also includes data buffer pointers 166. The data buffer pointers 166 identify locations in the data buffers 168. In certain embodiments, the memory controller 122 uses the data buffer pointers 166 to perform DMAs to satisfy a read or write command. Note that in one embodiment, a data buffer pointer is located in a command on the command submission queue 162.

In one embodiment, the memory controller 122 replaces one or more of the data buffer pointers 166 associated with a memory access command with one or more other data buffer pointers. Further details are discussed below.

In one embodiment, the submission queues (SQs) 162, command completion queues (CQs) 164, and data buffer pointers 166 are compliant with NVM Express. In one embodiment, the data buffer pointers 166 are NVMe "Physical Region Page" (PRP) entries. However, the submission queues (SQs) 162, command completion queues (CQs) 164, and data buffer pointers 166 are not required to be compliant with NVM Express.

The host memory 160 also includes a host memory buffer (HMB) 170. The HMB 170 may be a buffer that is allocated by the host system 140 for use of the memory controller 122. In some embodiments, the HMB 170 is for exclusive usage of the memory controller 122. For example, the memory controller 122 could use the HMB 170 to cache data. The host system 140 guarantees that the data in the HMB 170 will be valid and is obliged to notify the memory controller 122 before any operation which might cause data loss (e.g., power loss, host might need this buffer, etc., . . . ), in one embodiment. The host system 140 lets the memory controller 122 acknowledge this operation before the data is lost, in one embodiment. In one embodiment, NVMe specifies the requirements for the HMB 170, which state that the HMB 170 is allocated for exclusive use by the memory controller 122 and the data is guaranteed to be valid. In one embodiment, the host system 140 allocates the HMB 170 to the memory controller 122 when the memory controller 122 is initialized. The memory controller 122 is initialized when the non-volatile memory device 100 is powered on, in one embodiment.

The interface 120 between the host system 140 and the memory controller 122 may be any suitable interface. In one embodiment, the interface 120 is a Peripheral Component Interconnect Express (PCIe) bus. In one embodiment, the non-volatile memory device 100 may be a card based system, such as a secure digital (SD) or a micro secure digital (micro-SD) card. In an alternative embodiment, the non-volatile memory device 100 may be part of an embedded non-volatile memory device. For example, the non-volatile memory device 100 may be embedded within the host system 140, such as in the form of a solid state disk (SSD) drive installed in a personal computer.

As depicted in FIG. 2A, the memory controller 122 includes a front end module 208 that interfaces with host system 140, a back end module 210 that interfaces with the one or more memory die 108, each containing various other components or modules that perform functions which will now be described in detail.

The memory controller 122 may interface with one or more memory dies 108. In one embodiment, the memory controller 122 and multiple memory dies (together comprising the non-volatile memory device 100) implement a solid state drive (SSD), which can emulate, replace or be used instead of a hard disk drive inside a host, as a Network Attached Storage (NAS) device, etc. Additionally, the SSD need not be made to work as a hard drive.

In some embodiments, the non-volatile memory device 100 includes a single channel between the memory controller 122 and memory die 108, the subject matter described herein is not limited to having a single memory channel. For example, in some non-volatile memory device architectures, 2, 4, 8 or more channels may exist between the memory controller 122 and the memory die, depending on memory controller capabilities. In any of the embodiments described herein, more than a single channel may exist between the memory controller and the memory die, even if a single channel is shown in the drawings.

Referring again to modules of the memory controller 122, front end module 208 includes a physical layer interface (PHY) 222 that provide the electrical interface with the host system 140 or a next level storage memory controller. In one embodiment, PHY 222 includes hardware that is compliant with Peripheral Component Interconnect Express (PCIe). However, PHY 222 is not limited to PCIe.

The front end module 208 typically facilitates transfer for data, control signals, and timing signals. In some embodiments, the front end module 208 is capable of processing commands (e.g., memory access commands to read or write the memory structure 126 in the memory dies 108) that are described in NVM Express (NVMe). NVMe is a logical device interface that may be used to access non-volatile storage attached when using a PCIe bus between the host system 140 and the non-volatile memory device 100. However, note that the logical device interface is not limited to NVMe. Also, the bus is not limited to a PCIe bus.

A host queue manager 246 is configured to fetch and parse commands from the command submission queue 162. The host queue manager 246 may also queue the commands internally (i.e., within the memory controller 122) for execution. In one embodiment, the host queue manager 246 determines when to send a command from the internal queue (within the memory controller 122) to a command executer 228 within a backend module 210 of the memory controller 122. In one embodiment, the host queue manager 246 also sends an indication to the host system 140 when a command is complete. For example, the host queue manager 246 could store information on command completion queue 162 when a command (such as a read or write command) is complete.

The control path 242 has host pointer manager 250. The control path 242 has access to storage 251 that may have stored therein data buffer pointers 252, management tables 256, and HMB pointers 172. Storage 251 may be volatile or non-volatile memory. The host pointer manager 250 is configured to fetch data buffer pointers 166 from the host memory 160. For example, a command (such as a read or write command) that is fetched by the host queue manager 246 may have one or more data buffer pointers associated with it. In certain embodiments, the host pointer manager 250 is configured to fetch the data buffer pointers associated with a command, and to store them as data buffer pointers 252 in storage 251. In one embodiment, data buffer pointers 252 are NVMe PRP entries.

The host pointer manager 250 may also be configured to replace one or more of the original data buffer pointers associated a given command (e.g., read command) with one or more replacement data buffer pointers. In one embodiment, the host pointer manager 250 writes one or more replacement data buffer pointers to a command on the command submission queue 162 in host memory 160 to perform the data buffer pointer replacement. In one embodiment, the host pointer manager 250 replaces one or more original data buffer pointers 166 in host memory 160 to perform the data buffer pointer replacement. Numerous techniques are described herein for such replacements. Numerous reasons for such replacements are also described herein.

The storage 251 to which control path 242 has access also includes management tables 256. In one embodiment, the management tables 256 include L2P tables (logical to physical mappings) and P2L tables (physical to logical mappings). The memory controller 122 can use the management tables 256 to map logical addresses (LAs) to physical addresses (PAs). Such tables 256 can be used to directly map LAs to the PAs, or LAs can be mapped to intermediate or virtual addresses, which are mapped to PAs. In some embodiments, the logical addresses are logical block addresses, and the physical addresses are physical block addresses. Other variations are also possible.

The management tables 256 may also be used to manage caching of data in locations other than the memory structure 126 in the memory die 108. In one embodiment, the memory controller 122 caches data in the HMB 170. For example, the memory controller 122 may use the HMB 170 to cache data that is associated with some LA (or range of LAs). The management tables 256 may also be used to manage caching of data in the HMB 170. In one embodiment, the memory controller 122 caches data in the data cache 266. For example, the memory controller 122 may use the data cache 266 to cache data that is associated with some LA (or range of LAs). The management tables 256 may also be used to manage caching of data in the data cache 266. The data cache 266 is volatile memory (such as RAM 122b of FIG. 1B), in one embodiment.

The storage 251 to which control path 242 has access also includes HMB pointers 172. The HMB pointers 172 are data buffer pointers to the HMB 170. For example, each HMB pointer 172 could point to one unit of memory. Each unit of memory could be a page, wherein the page size is set by the host system 140. In one embodiment, the HMB pointers 172 are Host Memory Buffer Descriptors, in accordance with the NVMe protocol. However, the HMB pointers 172 are not limited to the NVMe protocol.

The front end module 208 can include other elements not expressly depicted in FIG. 2A. In one embodiment, front end module 208 includes various registers. In one embodiment, one of the registers is a "doorbell register," which the host system 140 may write in to inform the non-volatile memory device 100 that a new command is on the SQ 162.

DMA logic 253 is configured to control DMA transfer of data between the non-volatile memory device 100 and the host memory 160 in the host system 140. For example, DMA logic 253 may access data from data buffers 168 and transfer it to write buffers in RAM (e.g., FIG. 1B, 122b). DMA logic 253 may use data buffer pointers 166 to access the correct location in data buffers 168. DMA logic 253 may transfer data from read buffers in RAM 122b and transfer to data buffers 168. DMA logic 253 may use data buffer pointers 166 to access the correct location in data buffers 168 to transfer data read from memory structure 126 in a memory die 108. DMA logic 253 is also able to make a direct memory access to the host memory buffer 170. For example, DMA logic 253 may cache data into the HMB 170.

Back end module 210 includes a Scheduler 226, command executer 228, an error correction Controller (ECC) engine 224, and a memory interface 230.

Command scheduler 226 generates command sequences, such as program, read, and erase command sequences, to be transmitted to memory die 108. Command executer 228 oversees execution of those commands.

Memory interface 230 provides the command sequences to memory die 108 and receives status information from memory die 108. In one embodiment, memory interface 230 may be a double data rate (DDR) interface. In some embodiments, the memory interface 203 is a flash memory interface. However, the memory cells in memory die 108 are not limited to flash. Hence, memory interface 230 is not limited to a flash memory interface. In the event that memory cells in memory die 108 are flash, the back end module 210 may include a flash control layer, which controls the overall operation of back end module 210.

ECC engine 224 encodes the data bytes received from the host system 140, and decodes and error corrects the data bytes read from the memory die 108. In one embodiment, the ECC engine 224 comprises a low-density parity check (LDPC) decoder. Note that for both reads and writes, back end module 210 may perform additional processing of the data such as Error correction, scrambling, etc. Thus, for example, the data that is transferred to the data buffers 168 is typically not the raw data read from memory die 108.

The components of memory controller 122 depicted in FIG. 2A may take the form of a packaged functional hardware unit (e.g., an electrical circuit) designed for use with other components, a portion of a program code (e.g., software or firmware) executable by a (micro)processor or processing circuitry (or one or more processors) that usually performs a particular function of related functions, or a self-contained hardware or software component that interfaces with a larger system, for example. For example, each module (including, but not limited to, host queue manager 246 and host pointer manager 250) may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include or comprise software stored in a processor readable device (e.g., memory) to program a one or more processors for memory controller 122 to perform the functions described herein. The architecture depicted in FIG. 2A is one example implementation that may (or may not) use the components of memory controller 122 depicted in FIG. 1B (e.g., RAM 122b, ROM 122a, processor 122c).

Note that as a matter of convenience of explanation, storage 251 is depicted as within the memory controller 122. For example, storage 251 (containing data buffer pointers 252, management tables 256, and HMB pointers 172) is depicted within the control path 242. Note that storage 251 can be located within the memory controller 122 or external to the memory controller 122. Also, storage 251 could be implemented in volatile memory (e.g., RAM 122b of FIG. 1B) or non-volatile memory (e.g., memory structure 126). For example, the management tables 256 could be stored in the memory structure 126, with a portion of the management tables 256 cached in RAM 122b.

Figure 2B:
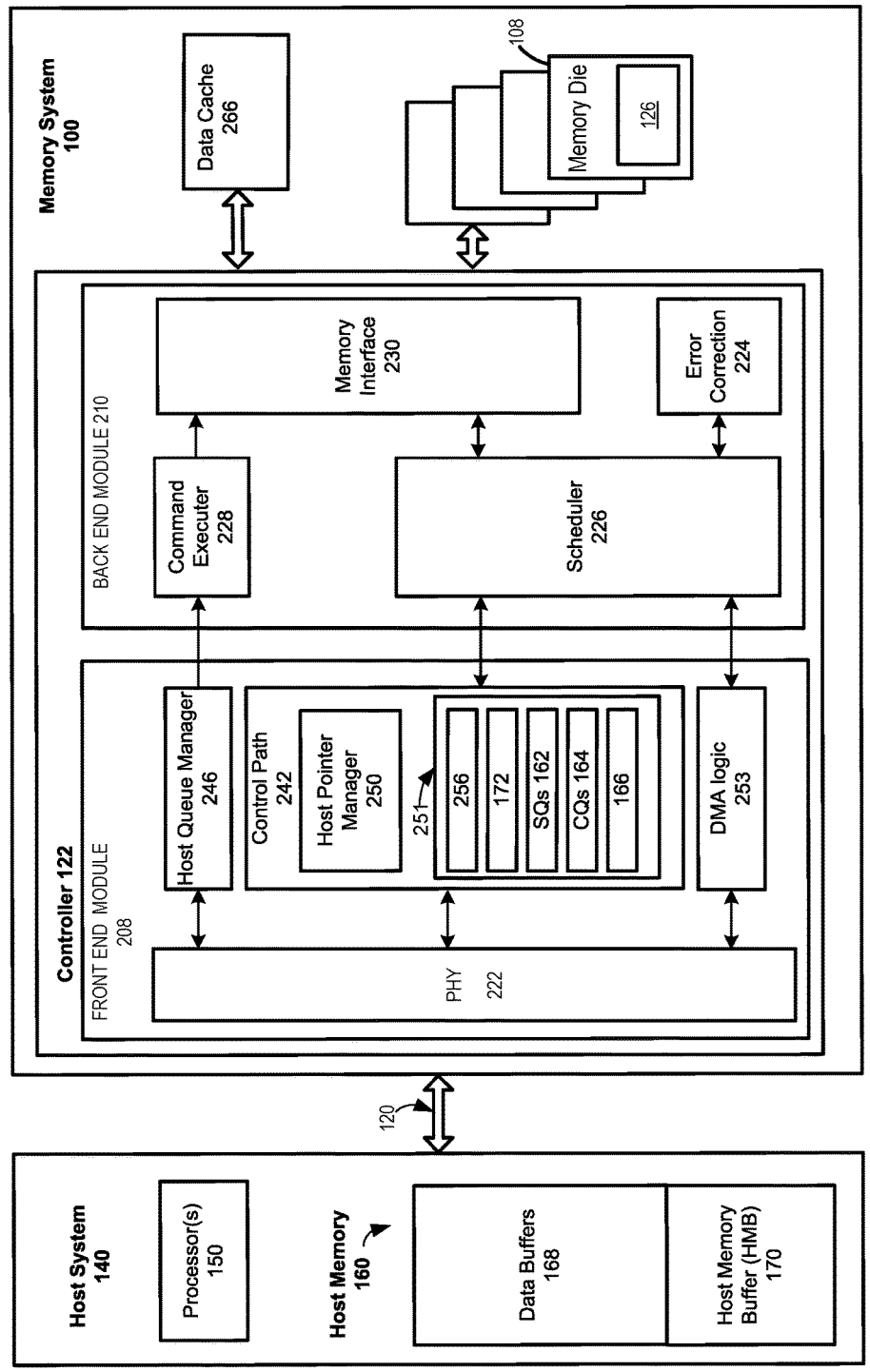
FIG. 2B is a block diagram of one embodiment of a non-volatile memory device and host, depicting more details of memory controller and host system.

FIG. 2B is a diagram of another embodiment of a non-volatile memory device 100 and host system 140. In this embodiment, SQs 162, CQs 164, and data buffer pointers 166 are stored in the non-volatile memory device 100. The SQs 162, CQs 164, and data buffer pointers 166 may be stored in volatile memory (e.g., RAM 122b) or non-volatile memory (e.g., memory structure 126). For example, the SQs 162, CQs 164, and data buffer pointers 166 can be stored in flash memory cells in a memory array. The portion of storage that stores the SQs 162, CQs 164, data buffer pointers 166, and HMB pointers 172 may be referred to as a controller memory buffer (CMB). The submission queues (SQs) 162 in the non-volatile memory device 100 allow the host system 140 to directly write commands to the memory controller's internal memory space, in one embodiment. This alleviates the need for the memory controller 122 to access commands from the host memory 160. The data buffer pointers 166 in the non-volatile memory device 100 allow the host system 140 to directly write the data buffer pointers to the memory controller's internal memory space, in one embodiment. Likewise, the HMB pointers 172 in the non-volatile memory device 100 allow the host system 140 to directly write the data buffer pointers to the memory controller's internal memory space, in one embodiment. A controller memory buffer based SQs 162, CQs 164, and data buffer pointers 166 may be used in a similar manner when the SQs 162, CQs 164, and data buffer pointers 166 are stored on the host system 140. A difference being that the memory controller's memory space is used instead of the host memory 160.

In the embodiment of FIG. 2B, the host memory 160 contains data buffers 168 and HMB 170. Thus, the memory controller 122 may initiate DMAs to/from data buffers 168 based on data buffer pointers 166.

Other variations to the embodiments depicted in FIGS. 2A and 2B are possible. For example, any subset of the SQs 162, CQs 164, and data buffer pointers 166 may be stored in the non-volatile memory device 100. For example, SQs 162 and CQs 164 are stored in the non-volatile memory device 100, but data buffer pointers 166 are stored in the host memory 160, in one embodiment.

Figure 3A:
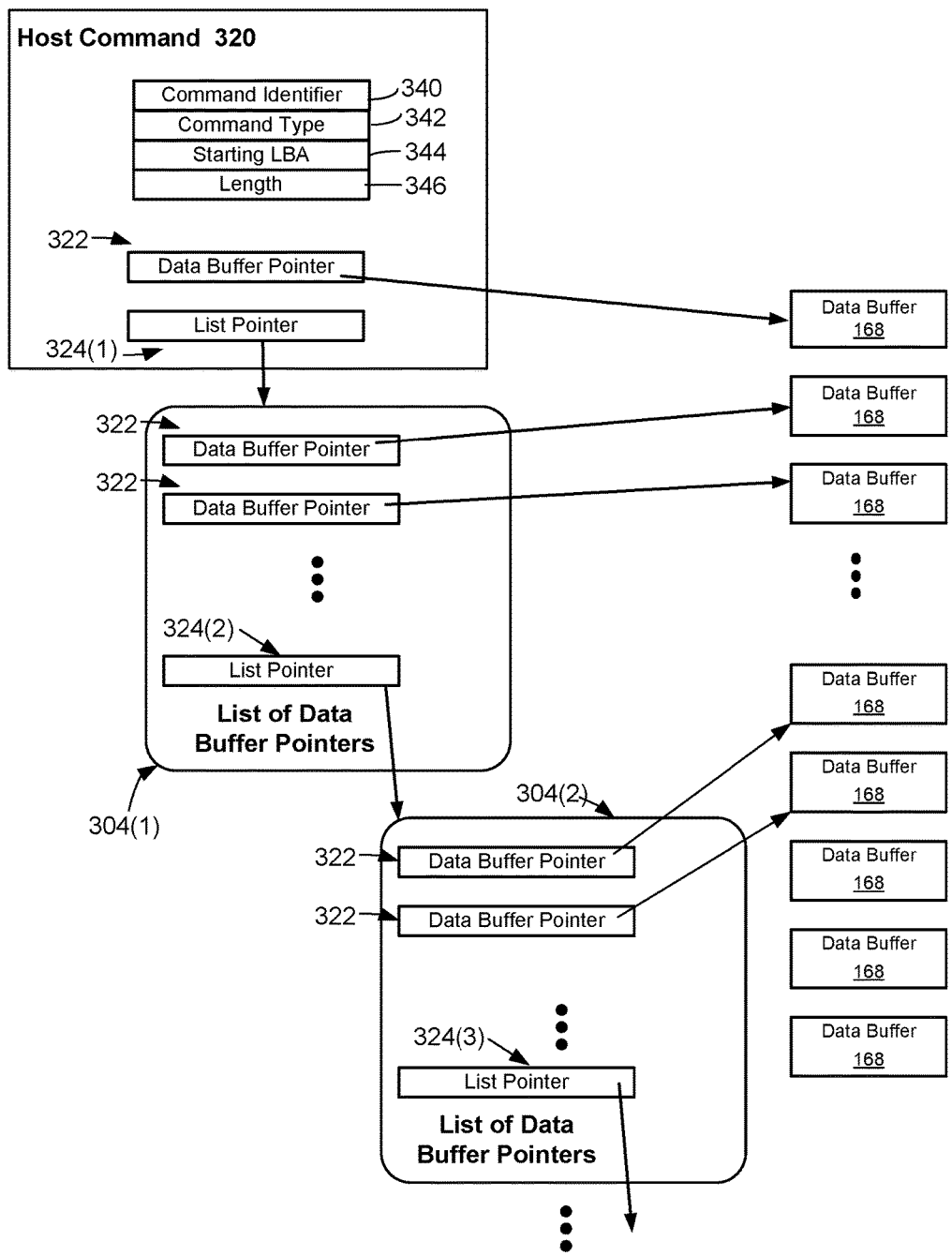
FIG. 3A is a diagram of one example of a host command, data buffers, and lists of data buffer pointers.

FIG. 3A is a diagram of one example of a host command 320, data buffers 168, and lists 304 of data buffer pointers 322. In some embodiments, the memory controller 122 replaces one or more of the original data buffer pointers with another set of one or more replacement data buffer pointers. Such replacement can save time and/or power when responding to a read command.

In one embodiment, each of the data buffers 168 is a physical page in the host memory 160. Also, each of the lists 304 is a physical page in the host memory 160, in one embodiment. The lists 304 reside in data buffer pointers 166 in the host memory 160, in one embodiment. However, note that the lists 304 could alternatively reside in the non-volatile memory device 100. For example, with respect to the embodiment of FIG. 2B, the lists 304 could reside in data buffer pointers 166.

The host system 140 may place the host command 320 on SQs 162 in host memory 160, in one embodiment. The host system 140 may place the host command 320 on SQs 162 in RAM 122b, in one embodiment. Note that the host command 320 could be for a memory access operation, such as write (also referred to as "program") or read. The command identifier 340 may be used to identify the command. In other words, the command identifier 340 may distinguish one read command from another read command, etc. The memory controller 122 may use this command identifier 340 to provide status for the completed command on the completion queue (e.g., FIG. 2A, 164 or FIG. 2B, 164). The command type 342 indicates the type of command (e.g., read, write, etc.). The starting LBA field 344 indicates the starting logical block address (LBA) for a read or write. The length field 346 is for the length of the read or write. The length could be specified as a number of logical blocks. Note that the memory controller 122 may convert the starting LBA, as well as other LBAs as indicated by the length of the read or write, to physical addresses in memory structure 126.

In an embodiment, the host command 320 includes a field that may contain a data buffer pointer 322, and a field that may contain a list pointer 324(1). For example, data buffer pointer 322 in host command 320 may point to a data buffer 168 in the host memory 160. List pointer 324(1), if used, may point to a list 304 of data buffer pointers in the host memory 160, in one embodiment. Note that in some embodiments, list pointer 324(1), if used, may point to a list of data buffer pointers in the non-volatile memory device 100 (e.g., 166, FIG. 2B). The host command 320 may have other fields as well. For example, various fields may be used for data management, such as whether the data is compressible, whether this command is part of a sequential request, latency requirements, etc.

In FIG. 3A, data buffer pointer 322 in the host command 320 points to the first data buffer in host memory, in this example. In some embodiments, data buffer pointer 322 in the host command 320 has an offset which may be zero or non-zero. The offset may be used to refine the starting location of the data buffer.

List pointer 324(1) points to a list 304(1) of data buffer pointers, in this example. List 304(1) contains a number of entries. All but the last entry contains a data buffer pointer 322, which each point to a data buffer in the host memory. The last entry 324(2) in list 304(1) contains a pointer to another list 304(2). List 304(2) contains a number of entries. All but the last entry contains a pointer 322 to a data buffer in the host memory. The last entry 324(3) in list 304(2) may contain a pointer to still another list 304 (not depicted in FIG. 3A). Herein, the term "list pointer" may be used to refer to a pointer to a list that includes data buffer pointers 322. However, note that the list could also include entries that are not data buffer pointers, such as a pointer to another list. Note that the least entry is not always a pointer to another list 304. The last entry may simply be a pointer to a data buffer.

In one embodiment, the entry for each data buffer pointer 322 is a physical region page (PRP) entry as the term is used in NVMe. A physical region page (PRP) entry may be a pointer to a physical memory page in host memory. The PRPs may be used as a scatter/gather mechanism for data transfers between the non-volatile memory controller 122 and the host memory 160. In one embodiment, the size of a physical memory page in host memory 160 is configured by the host system 140. For example, the host system 140 might specify that each physical memory page is 4 KB, 8 KB, 16 KB, or some other size.

In one embodiment, the PRP entries are a fixed size. In one embodiment, a PRP entry may be a 64-bit (e.g., 8 Byte) physical memory page address. However, the PRP entries could be larger or smaller than 64-bits. A PRP entry may have a page base address and an offset. In one embodiment, the lower bits of a PRP entry indicate an offset within a physical memory page in host memory. For example, if the memory page is 4 KB, then bits 11:02 may form the offset, if the memory page is 8 KB, then bits 12:02 may form the offset, etc.

In one embodiment, the entries for the list pointers 324 are each a pointer to a list of NVMe PRPs. Thus, in one embodiment, lists 304 are PRP lists. As one example, a PRP list could have 512 PRP entries. For example, the PRP list could be 4 KB in size, with 512 PRP entries that are each 64 bits. However, there may be more or fewer PRP entries in a PRP list. Also, the PRP list could be larger or smaller than 4 KB. For example, an 8 KB PRP list might contain 1024 entries that are each 64 bits. In one embodiment, the PRP list has a size equal to one single page of contiguous memory in the host memory.

Note that the host command 320 may be associated with more than one list 304 of data buffer pointers. The total number of data buffer pointers that are needed for a command may be implied by the command parameters and the physical memory page size. The last entry in the list 304 may either be a pointer to a data buffer or a pointer to the next list. In the event that the last entry is a pointer to the next list, that entry points to a host memory address that contains the next list 304. Note that the next list 304 may comprise one physical memory page.

In one embodiment, the memory controller 122 is able to determine the location of the last entry in a given list 304 based on the size of one physical memory page. The memory controller 122 is able to determine whether the last entry is a pointer to another list 304 or is a data buffer pointer based on whether more data buffer pointers are needed to satisfy the read or write command, in one embodiment.

There could be a large number of lists 304. For example, a command might be to read 256 MB in the non-volatile memory device. If each data buffer is 4 KB, this might require about 64,000 data buffers—and hence 64,000 list entries. With each list entry being 64 bits, this means that the data buffer pointers could use about 512 KB of storage.

Note that for some read or write commands, list pointer 324(1) in the host command 320 is not used. For example, if a read is for just a one data buffer, then just the data buffer 322 in the host command 320 might be used. Also, in some cases, there might be just one list 304. Again, this may be the case if there is a relatively small amount of data to be read or written.

As briefly mentioned above, the memory controller 122 may replace one or more of the original data buffer pointers with another set of one or more replacement data buffer pointers, in one embodiment. In one embodiment, the memory controller 122 replaces the data buffer pointer 322 in the host command with a replacement data buffer pointer that points to a different data buffer in host memory. In one embodiment, the memory controller 122 replaces the list pointer 324(1) with a list pointer that points to a different list of data buffer pointers. This in effect will replace the list 304(1) with a replacement list. Thus, the data buffer pointers 322 in the original list will be replaced with the data buffer pointers 322 in the replacement list. In one embodiment, the memory controller 122 replaces the list pointer 324(2) with a list pointer that points to a replacement list. This in effect will replace the list 304(2) with another list. Likewise, list pointer 324(3) could be replaced with another list pointer. In one embodiment, the memory controller 122 replaces one or more of the original data buffer pointers 322 in a list with a corresponding one or more replacement data buffer pointers. Note that the host system 140 may obtain the replacement data buffer pointers simply by accessing the host command 320 and associated lists 304, in one embodiment.

Figure 8A:
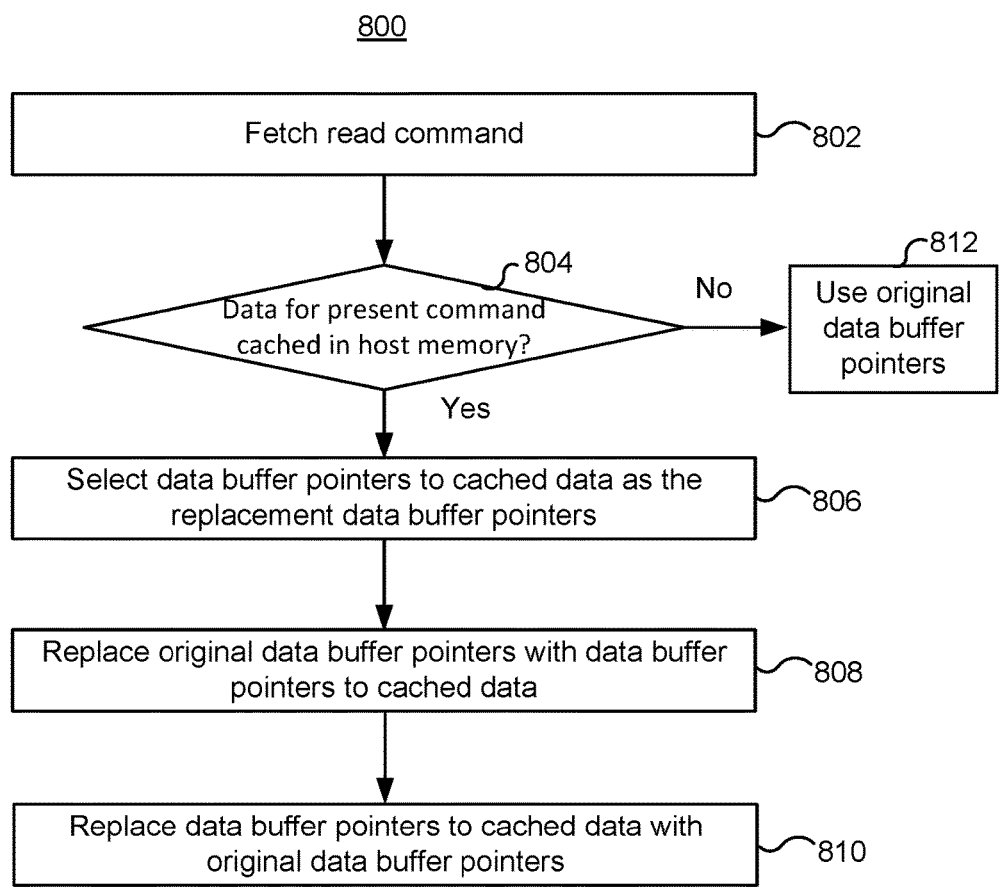
FIG. 8A is a flowchart of one embodiment of a process of replacing original data buffer pointers with replacement data buffer pointers in response to determining data for a read command is cached in host memory.
Figure 8B:
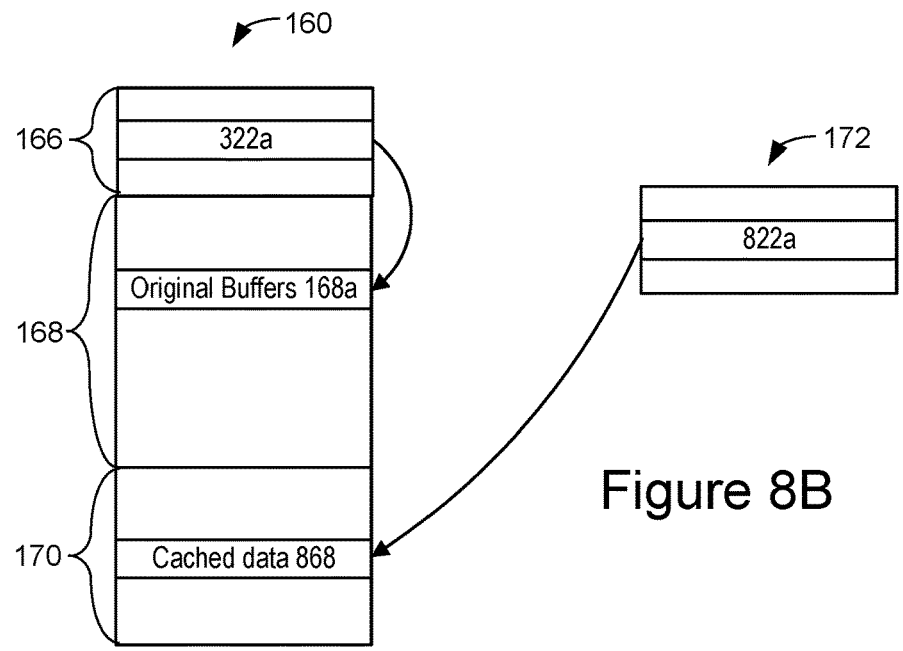
FIGS. 8B and 8C depict host memory usage in one embodiment of the process of FIG. 8A.
Figure 8C:
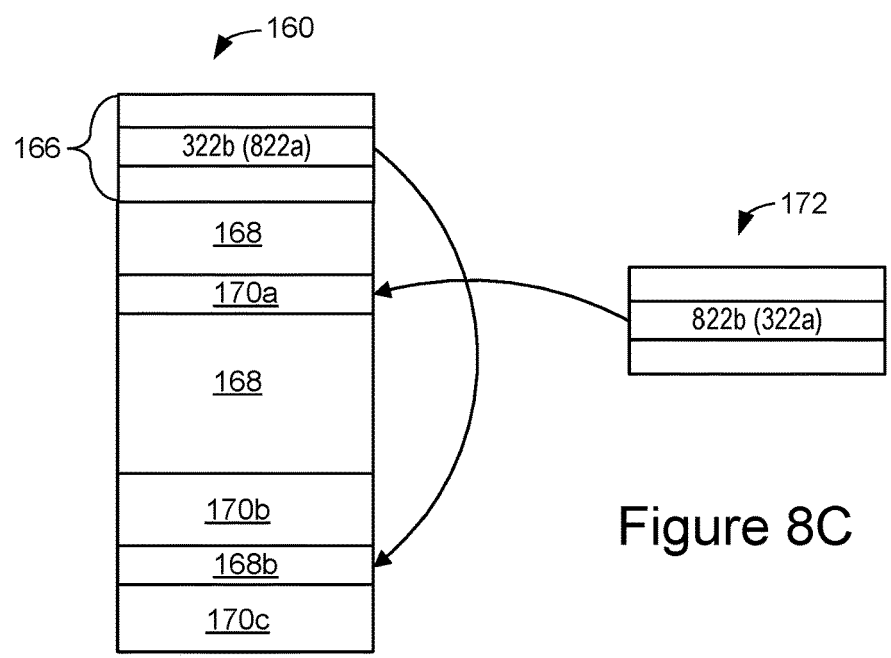

Replacing one or more of the original data buffer pointers with another set of one or more replacement data buffer pointers may save time and/or power when responding to a read command. For example, in some cases, the data needed to respond to a read command may already be cached in the host memory. Replacing the original data buffer pointers associated with the read command with replacement data buffer pointers to the data already cached in host memory is a very efficient way to respond to the specific read command. FIGS. 8A-8C depict one embodiment of replacing the original data buffer pointers associated with the read command with replacement data buffer pointers to the data already cached in host memory.

Figure 9:
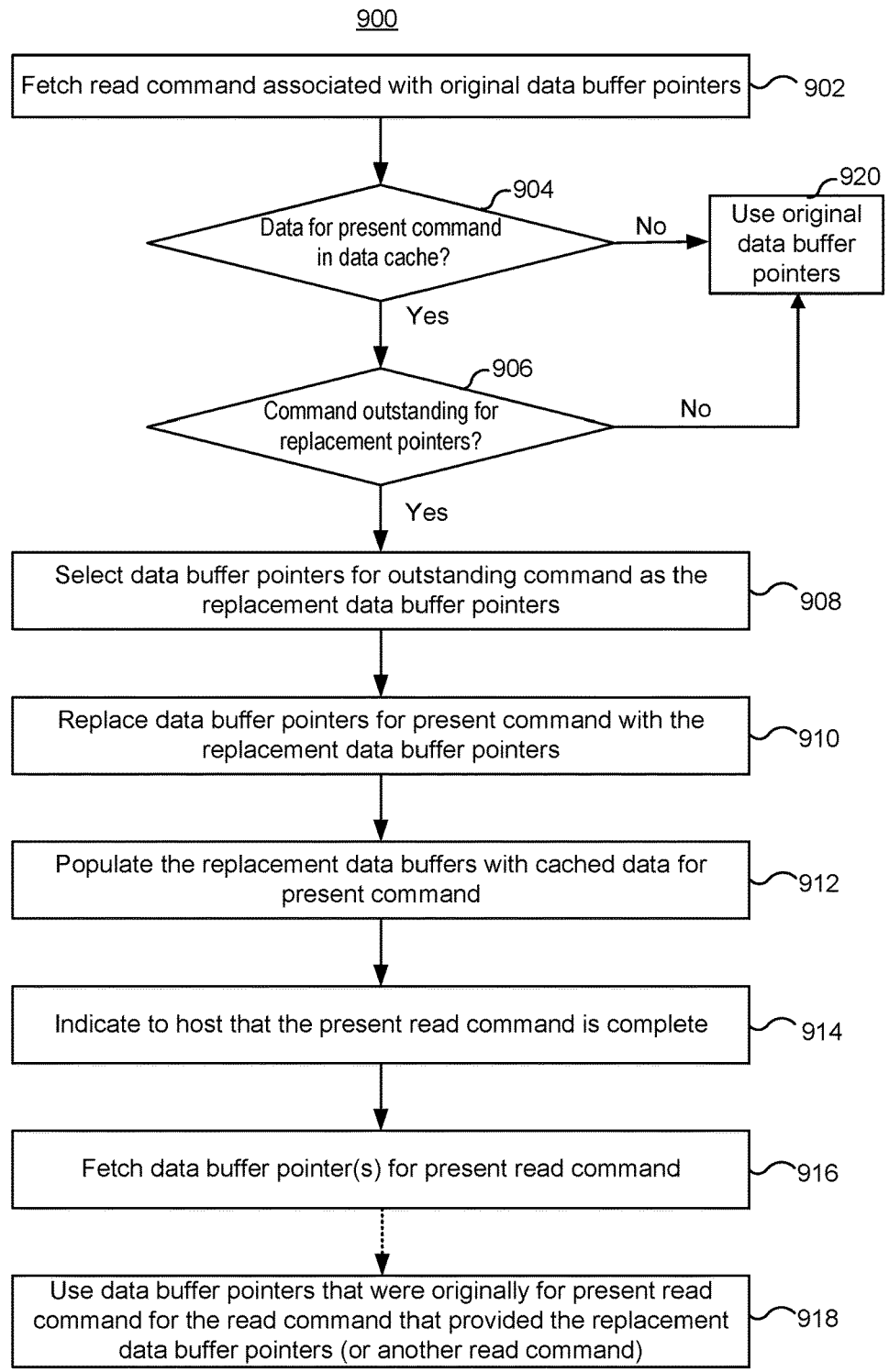
FIG. 9 is a flowchart of one embodiment of a process of replacing original data buffer pointers with replacement data buffer pointers in response to determining that there is an outstanding command having suitable replacement pointers.

Note that many of the data buffer pointers 322 in FIG. 3A are not in the host command 320. Thus, even after the memory controller 122 has fetched a specific read command, it may take some time to obtain the data buffer pointers in the lists 304. In some cases, the data needed to respond to the specific read command is already cached in the non-volatile memory device. However, as noted, the memory controller might not have obtained the data buffer pointers to the data buffers to which the memory controller is to transfer the data. However, the memory controller 122 might have already obtained data buffer pointers for another read command. Moreover, the memory controller 122 might not be able to use those data buffer pointers at this time because the data for the other read command has not yet been read from memory structure 126. Replacing the original data buffers pointers for the specific read command with the data buffer pointers for the other read command (which may be referred to as replacement data buffer pointers) can save time in responding to the specific read command. FIG. 9 depicts one embodiment of replacing the original data buffer pointers associated with a read command for which data is cached in the non-volatile memory device with replacement data buffer pointers that were originally for a read command that is presently waiting to be executed (and hence data has not yet been obtained from non-volatile storage 126).

Figure 3B:
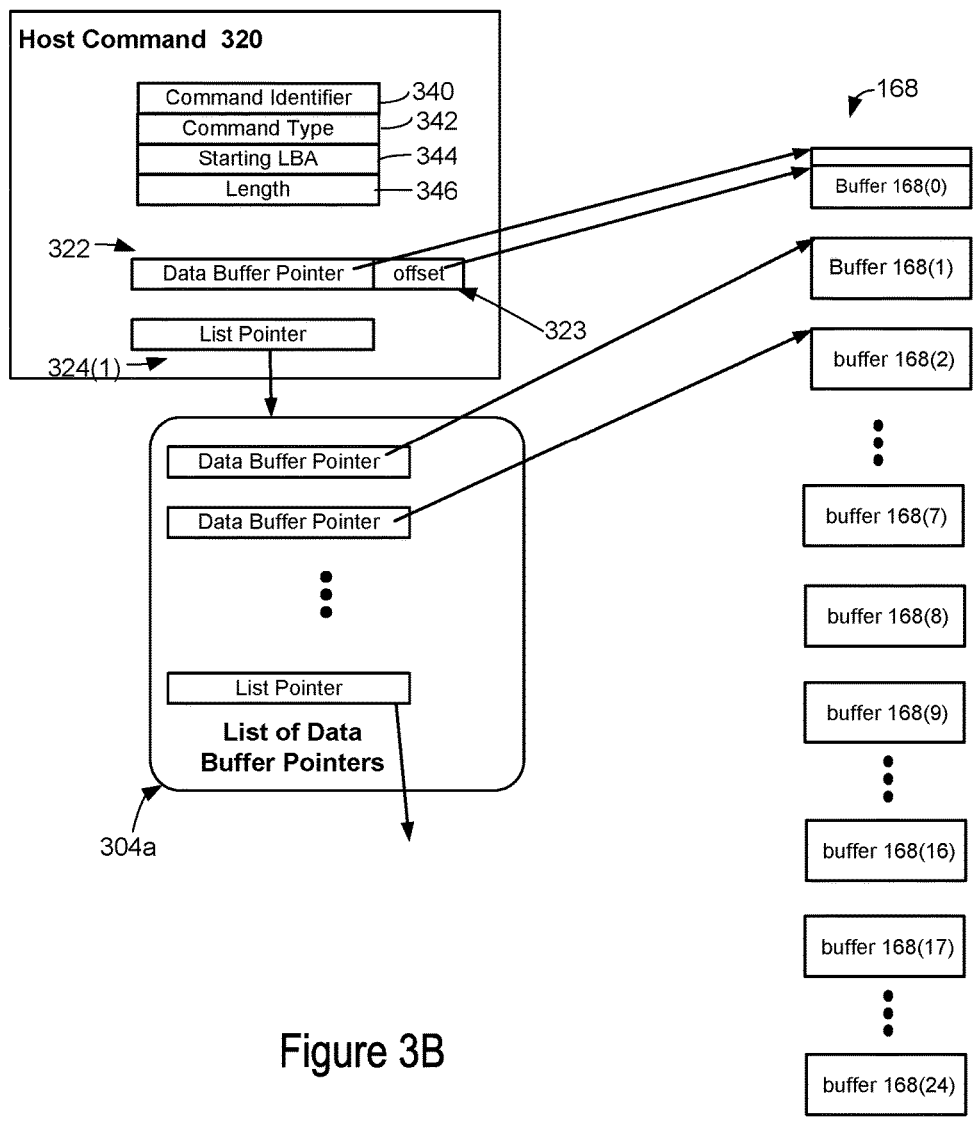
FIG. 3B shows a diagram one example of a host command, data buffers, and lists of data buffer pointers, in which the data buffer pointer in the host command has a non-zero offset.

In one embodiment, the first data buffer pointer in the command from the host system 140 may have an offset. FIG. 3B shows a diagram of another example of a host command 320, data buffers 168, and list of data buffer pointers similar to FIG. 3A. List 304(2) from FIG. 3A is not depicted so as to simplify the diagram. Also, the data buffer pointer 322 in host command 320 in FIG. 3B has a non-zero offset 323. With this offset 323, the size of the first data buffer 168(0) is less than the size of other buffers. For example, buffers 168(1) through 168(24) may each be 4 KB. However, the used portion of buffer 168(0) may be less than 4 KB by the size of the offset 323. Note that a data buffer may be defined by the size of a data buffer (which may be a fixed value specified by the host) and the host memory address to which a data buffer pointer points. For example, the pointers to data buffers 168(1), 168(2), etc. point to the beginning of the data buffer, in one embodiment.

Figure 10:
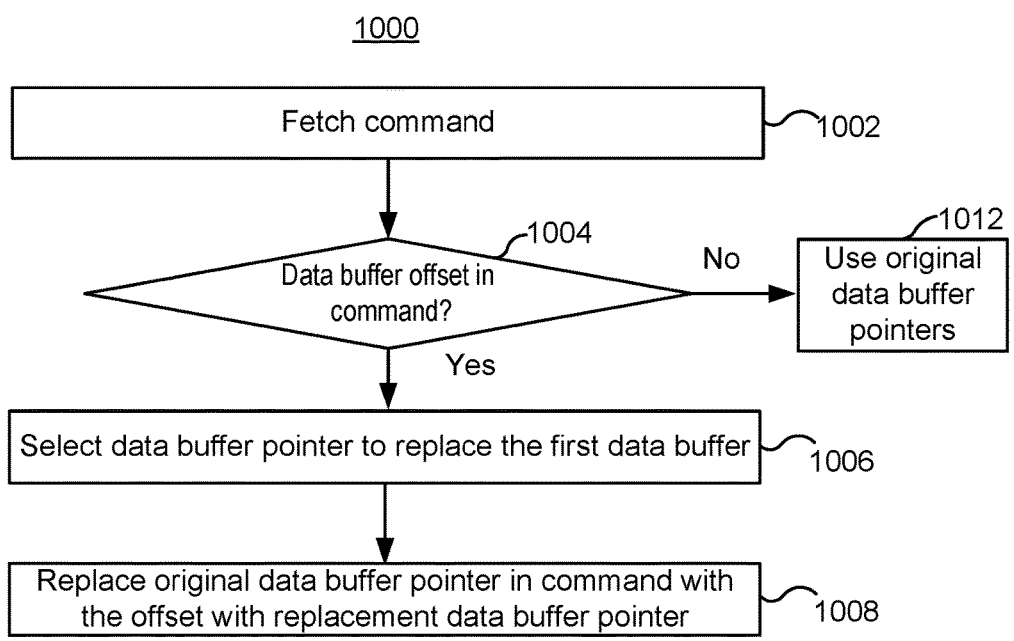
FIG. 10 is a flowchart of one embodiment of a process of replacing an original data buffer pointer with a replacement data buffer pointer in response a data buffer pointer in the host command having a non-zero offset.

The offset 323 may potentially cause all transfers between the host system 140 and the non-volatile memory device 100 to be unaligned. For example, the non-volatile memory device may want to transfer the first 64 KB. Assuming a 4 KB data buffer, this corresponds to eight complete data buffers. In this example, the pointer 322 to the first buffer is needed for the data transfer as well as the eight data buffer pointers in the first list 304(1). These eight data buffer pointers point to data buffers 168(1) to 168(8). However, the last data buffer (e.g., 168(8)) associated with this example 64 KB transfer will not be fully populated from this 64 KB data due to the offset. In one embodiment, a replacement of one or more original data buffer pointers is used to cause the data transfer to be aligned, thereby creating a more efficient data transfer. FIG. 10 and its description are one embodiment of replacing an original data buffer pointer when there is an offset 323 associated with a data buffer pointer.

Figure 4:
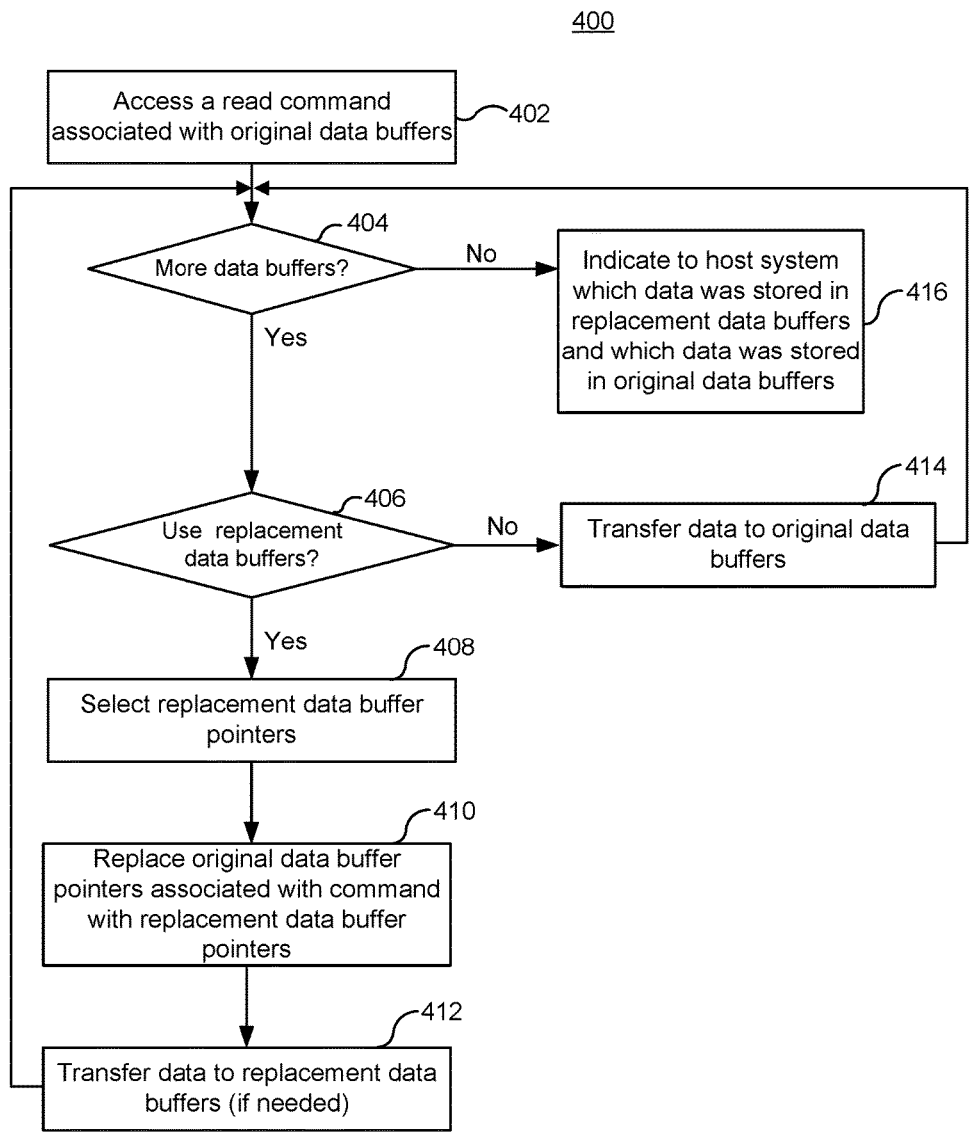
FIG. 4 is a flowchart of one embodiment of a process of operating a non-volatile storage system, which comprises replacing original data buffer pointers with replacement data buffer pointers.

FIG. 4 is a flowchart of one embodiment of a process 400 of operating a non-volatile memory device. The process 400 may include replacing one or more original data buffer pointers associated with a memory access command with one or more replacement data buffer pointers. In one embodiment, a memory controller 122 performs the process 400. In one embodiment, the process 400 is performed in an environment such as depicted in FIG. 2A in which the host system 140 contains SQs 162, CQs 164, and data buffer pointers 166. In one embodiment, the process 400 is performed in an environment such as depicted in FIG. 2B in which the non-volatile memory device 100 contains SQs 162, CQs 164, and data buffer pointers 166. In one embodiment, process 400 is performed in an environment in which the host system 140 contains data buffer pointers 166, but non-volatile memory device has SQs 162 and CQs 164. In some embodiments, the host system 140 has data buffer pointers 166. In some embodiments, the data buffer pointers 166 are NVMe PRP entries.

In step 402, the memory controller 122 accesses a read command that was provided by the host system 140. The read command contains an address (e.g., logical address) and length, in one embodiment. The memory controller 122 may translate the logical address to a physical address. The physical address may be in memory structure 126. Note that the memory controller 122 might not need to access the memory structure 126 to respond to the read command if, for example, the data for the logical address is cached in data cache 266 or HMB 170. In one embodiment, the memory controller 122 accesses the command from SQs 162 in the host memory 160. In one embodiment, the memory controller 122 accesses the command from SQs 162 on the non-volatile memory device 100.

The read command may be associated with at least one original data buffer. The original data buffer(s) are locations in host memory 160 at which the memory controller 122 is to store data for the logical address(es) specified by the read command. The read command may also be associated with at least one data buffer pointer 322 to the original data buffers. One or more of the data buffer pointers 322 may be in the read command itself. For example, host command 320 in FIG. 3A has a data buffer pointer 322 in the command. However, the data buffer pointer need not be in the command itself. For example, host command 320 in FIG. 3A has a list pointer 324(1) that points to a list 304(1) of data buffer pointers 322. Also, list 304(1) itself has a list pointer 324(2), which points to another list 304(2) of data buffer pointers 322.

Step 402 may include the memory controller 122 responding to a "doorbell." The doorbell is a mechanism by which the host system 140 informs the non-volatile memory device 100 that a new command is ready on a submission queue (SQ) 162, in one embodiment. In one embodiment, the memory controller 122 has a doorbell register, which the host system writes to "ring the doorbell." The memory controller 122 may fetch the new command from the SQ 162 in response to the doorbell. In one embodiment, memory controller 122 accesses the read command from host memory 160 (e.g., command submission queue 162, FIG. 2A). In one embodiment, memory controller 122 accesses the read command from RAM 122*b* in the non-volatile memory device (e.g., command submission queue 162, FIG. 2B).

In step 404, the memory controller 122 determines whether there are more original data buffers for which replacement data buffers might instead be used. Note that some original data buffers might be used, while replacement data buffers might be used for other original data buffers associated with the read command. In one embodiment, the memory controller 122 may replace one or more original data buffer pointers with one or more replacement data buffer pointers in order to cause the replacement data buffers to be used. Thus, some original data buffer pointers may be replaced while others might not be replaced. Hence, the process 400 describes processing different groups of original data buffers for the read command. One technique for determining whether there are more original data buffers to process is to access the length of the data to be read from the read command, and factor in the size of data buffers 168. Assuming that there are more original data buffers associated with the read command, the process 400 continues as step 406.

Step 406 includes the memory controller 122 determining whether to use one or more replacement data buffers instead of a corresponding one or more original data buffers. In one embodiment, the memory controller 122 determines whether to perform replacement of one or more original data buffer pointers associated with the read command. Note that the original data buffer pointers may be referred to as a "set" of original data buffer pointers, wherein the set includes one or more original data buffer pointers. The determination of whether to replace the original data buffer pointers may be based on a variety of factors. In one embodiment, the memory controller 122 determines whether to replace one or more original data buffer pointers responsive to a determination that the HMB 170 has data needed to respond to the command. Further details of one such embodiment are shown and described with respect to FIGS. 8A-8C.

In one embodiment, the memory controller 122 replaces a data buffer pointer (to host memory) that has not yet been obtained by the memory controller with a data buffer pointer (to host memory) that has already been obtained by the memory controller. In one embodiment of step 404, the memory controller 122 replaces one or more original data buffer pointers responsive to a determination that there is a command (e.g., read command) waiting to be executed and for which one or more data buffer pointers have already been obtained. In this case, the already obtained data buffer pointer(s) may be used to replace the original data buffer pointer(s). Further details of one such embodiment are shown and described with respect to FIG. 9.

In one embodiment, the memory controller 122 replaces one or more original data buffer pointers responsive to a determination that the data buffer pointer 322 in the host command 322 has a non-zero offset. Further details of one such embodiment are shown and described with respect to FIG. 10.

The determination of whether to replace the original data buffer pointers may be based on many other factors than the embodiments in FIGS. 8A-10. Other factors include, but are not limited to, data transfer size, host memory page size, PCIe bus turnaround time, avoidance of a copy operation, and number of available data buffer pointers.

Step 408 includes selecting replacement data buffer pointer(s) for the data buffer pointers(s) associated with the command (e.g., read command). In one embodiment, the replacement data buffer pointer(s) are data buffer pointers associated with another command (e.g., read command) to access the non-volatile storage. For example, data buffer pointers of one read command may be used to replace data buffer pointer of the present command (e.g., read command). In one embodiment, the replacement pointer(s) are HMB pointers 172. Thus, note that the replacement data buffers could be in the HMB 170.

Step 410 includes replacing the data buffer pointers associated with the command with the selected replacement data buffer pointers. There are numerous techniques for replacing the original data buffer pointers. FIGS. 5A-5C, 6A-6C, and 7A-7C show a few embodiments for replacing the original data buffer pointers.

Step 412 includes transferring data to the replacement data buffer(s), if needed. Step 410 may include populating the replacement data buffers that are pointed to by the replacement data pointers with data. Note that step 410 might be performed prior to accessing the read command in step 402. For example, step 410 might have been performed when transferring data for a different command from the non-volatile memory device 100 to the host memory 160.

Thus, also note that step 410 may be performed prior to selecting the replacement pointers in step 408.

Step 412 may include the memory controller 122 performing a DMA between the non-volatile memory device 100 and the host memory data buffers specified by the replacement data buffer pointers. The DMA is from a read buffer in the non-volatile memory device 100 to a data buffer in the host memory 160, in one embodiment.

The process 400 then returns to step 404 to determine whether there are more original data buffers for which replacement data buffers might be used instead. Alternatively, this step may be described as determining whether there are more original data buffer pointers to consider for replacement. For the sake of discussion, there are additional original data buffers to consider. Returning again to the discussion of step 406, in the event that the memory controller 122 determines to not use replacement data buffers for at least some of the original data buffers, then step 414 is performed. The path down step 414 may result in using original data buffer pointers and original data buffers associated with the read command. Step 414 includes transferring data to the original data buffers (for which replacement data buffers are not used).

The process 400 then returns to step 404 to determine whether there are more original data buffers for which replacement data buffers might be used instead. Assuming that there are not, then step 416 may be performed. Step 416 includes the memory controller 122 indicating to the host system 140 which data (if any) for the read command is stored in replacement data buffers and which data (if any) was stored in original data buffers. As noted, in some cases, it is possible to use some of the original data buffers and some replacement data buffers. Thus, for a single command it is possible to perform steps 408-412 for some original data buffers (and their pointers), while performing step 414 for other original data buffers (and their pointers).

Step 416 may include the memory controller 122 indicating to the host system 140 that the data for at least one logical address specified by the read command was stored in one or more replacement data buffers. Step 416 may also include the memory controller 122 specifying the location of the one or more replacement data buffers to the host system 140. Step 416 may include the memory controller 122 instructing the host system 140 to use the one or more replacement data buffers instead of one or more original data buffer pointers to obtain the data for at least one logical address.

Step 416 may include the memory controller 122 sending a command completion for the command of step 402 to the host system 140. In one embodiment, the memory controller 122 places a command response on the command completion queue 164. Note that to "place a command response on the command completion queue" 164 the memory controller 122 writes information to host memory 160 in one embodiment in which CQ 164 is stored in host memory 160. Note that to "place a command response on the command completion queue" 164 the memory controller 122 writes information to storage 251 in one embodiment in which CQ 164 is stored in storage 251 in the non-volatile memory system 100. The memory controller 122 may also provide some indication to the host system 140 that the command response has been placed on the command completion queue 164. Note that step 416 is performed after transforming data to the replacement data buffers, in step 412. Also, step 416 is performed after replacing the replacing the original data buffer pointers in step 410. Moreover, note that when the host system 140 looks for the data for the read command, the host system 140 will obtain the replacement data buffer pointers simply by reading at the location at which the host system 140 placed the original data buffer pointers, in one embodiment. For example, with respect to FIG. 3A, the host system 140 may access the host command 320 from a submission queue 162, and use list pointer 324(1) to locate lists 304. Thus, the act of sending the command completion informs the host system 140 that one or more of the original data buffer pointers have been replaced by a corresponding one or more replacement data buffer pointers, in one embodiment. Also, the act of sending the command completion specifies the location of the one or more replacement data buffers to the host system 140, in one embodiment. Also, the act of sending the command completion instructs the host system 140 to use the one or more replacement data buffers instead of one or more original data buffer pointers to obtain the data for at least one logical address, in one embodiment.

Figure 5A:
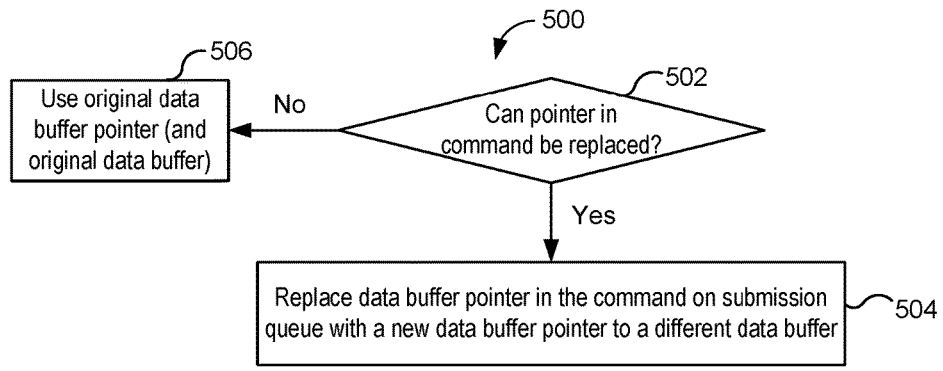
FIGS. 5A, 5B, and 5C depict one embodiment of replacing a data buffer pointer in the host command itself.
Figure 5B:
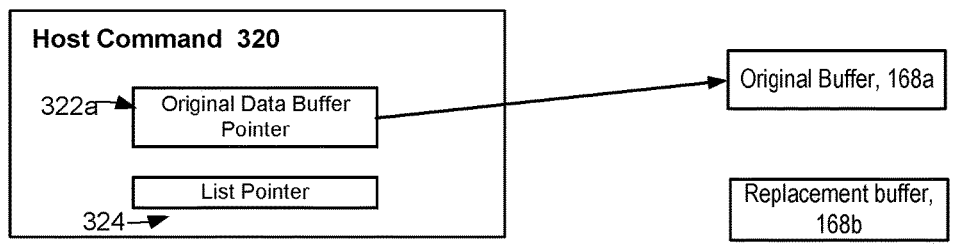
Figure 5C:
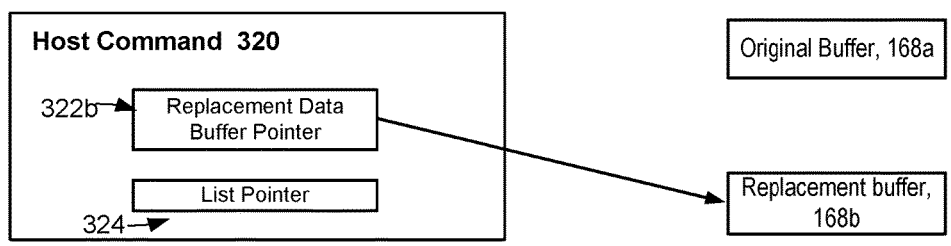

FIGS. 5A-5C depict one embodiment of replacing a data buffer pointer in the host command itself. FIG. 5A is a flowchart of one embodiment of a process 500 of replacing a data buffer pointer in the command itself. The process 500 may be used for some steps (e.g., 406, 408, 410, and 414) of process 400. FIGS. 5B and 5C depict simplified versions of the host command 320 that was previously discussed with respect to FIG. 3A. FIG. 5B depicts the host command 320 as it was received in step 402 of process 400. Thus, FIG. 5B depicts what the memory controller 122 may access from a command submission queue 162. The host command 320 has an original data buffer pointer 322a to an original data buffer 168a. The original data buffer 168a may be anywhere in the host memory 160. The host command 320 is a read command, in one embodiment.

Step 502 includes a determination of whether the data buffer pointer in the host command 320 can be replaced. In one embodiment, the memory controller 122 determines whether original data buffer pointer 322a to original data buffer 168a can be replaced with a pointer to another data buffer. In one embodiment, the host queue manager 246 fetches the host command 320 from command submission queue 162. The host pointer manager 250 determines whether there is another data buffer pointer that might be used instead of the original data buffer pointer 322a. Step 502 is one embodiment of step 406 in process 400. The memory controller 122 may determine the data buffer pointer in the host command 320 can be replaced based on factors already discussed in step 406. Further details of embodiments of making this determination are discussed below with respect to FIG. 8A (see for example step 804), FIG. 9 (see for example steps 904 and 906); and FIG. 10 (see for example step 1004).

Step 504 is performed if the original data buffer pointer can be replaced. Step 504 includes replacing the original data buffer pointer in the host command 320 with a replacement data buffer pointer to a different data buffer in host memory 160. In one embodiment, the memory controller 122 modifies the host command 320 that is on the command submission queue 162. Note that to "modify the host command 320" the memory controller 122 changes information in memory that stores the host command 320. With reference to FIGS. 5B and 5C, the original data buffer pointer 322a to the original data buffer 168a may be replaced with a replacement data buffer pointer 322b to a replacement data buffer 168b. Step 504 is one embodiment of steps 408 and 410 in process 400.

The replacement data buffer 168b could be anywhere in host memory 160. The replacement data buffer 168b may be data buffers 168. In one embodiment, the replacement data buffer 168*b* is in the HMB 170. In this case, the replacement data buffer pointer 322*b* may be one of the HMB pointers 172.

Note that at some point the memory controller 122 populates the replacement data buffer 168*b* with data, in one embodiment. However, this could happen prior to or after process 500. For example, one reason why the replacement data buffer 168*b* may have been selected was that it already contained the data needed to respond to a read command. For example, the data to respond to a read command might have been cached in the HMB, in which case the replacement data buffer 168*b* would have been populated prior to process 500.

Note that if the data buffer pointer in the read command could not be replaced, then the original data buffer pointer (and original data buffer) is used (step 526). Step 506 is one embodiment of step 414 in process 400.

Figure 6A:
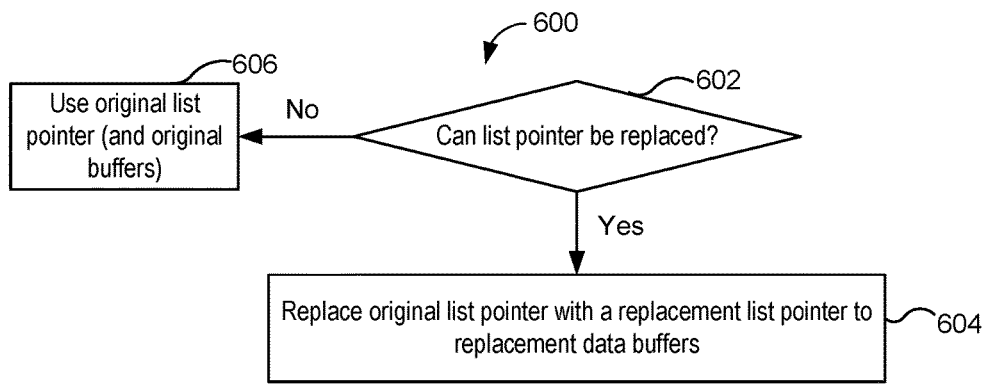
FIGS. 6A, 6B, and 6C depict one embodiment of replacing an original list pointer with a replacement list pointer.
Figure 6B:
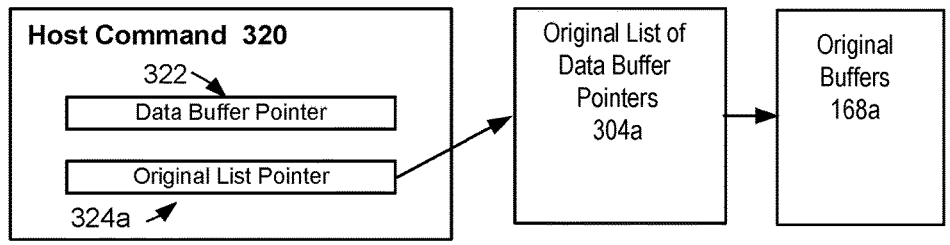
Figure 6C:
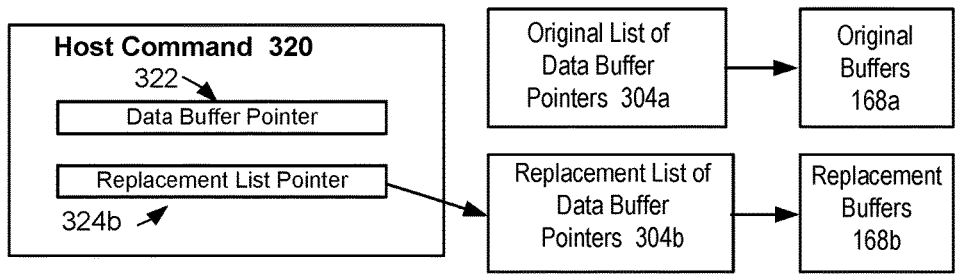

In one embodiment, the data buffer pointer replacement is achieved by replacing a list pointer. Note that to "replace a list pointer" the memory controller 122 changes information in memory that stores the list pointer. The list pointer may be a pointer to a list of data buffer pointers. FIGS. 6A-6C depict one embodiment of replacing an original list pointer with a replacement list pointer. FIG. 6A is a flowchart of one embodiment of a process 600 of replacing a list pointer 324. The process 600 may be used for some steps (e.g., 406, 408, 410, and 414) of process 400. FIGS. 6B and 6C depict simplified versions of the host command 320 that was previously discussed with respect to FIG. 3A. Note that the host command 320 is a read command, in one embodiment. FIG. 6B depicts the host command 320 as it was received in step 402. Thus, FIG. 6B depicts what the memory controller 122 may access from a command submission queue 162. The host command 320 has an original list pointer 324*a*, which points to an original list 304*a* of data buffer pointers. The original list 304*a* of data buffer pointers points to original data buffers 168*a*. Note that the original list pointer 324*a* is not required to be in the host command 320. An alternative is for the original list pointer 324*a* to be in one of the lists 304 of data buffer pointers. Note that FIGS. 6B and 6C do not show the data buffer pointers in the lists 304. However, each list 304 contains data buffer pointers 322, each of which may point to a data buffer 168, as depicted in FIG. 3A for example.

Step 602 includes a determination of whether the original list pointer 324*a* can be replaced. In one embodiment, the memory controller 122 determines whether the original list pointer 324*a* to the original list 304*a* of data buffer pointers can be replaced. This may be based in part on whether the original data buffers 168*a* can be replaced with a set of replacement data buffers. Step 602 is one embodiment of step 406 in process 400. The memory controller 122 may determine whether the original list pointer 324*a* to the original list 304*a* of data buffer pointers can be replaced based on factors already discussed in step 406. Further details of embodiments of making this determination are discussed below with respect to FIG. 8A (see for example step 804), FIG. 9 (see for example steps 904 and 906); and FIG. 10 (see for example step 1004).

Step 604 is performed if the original list pointer 324*a* can be replaced. Step 604 is one embodiment of steps 408 and 410 in process 400. With reference to FIGS. 6B and 6C, step 604 may include replacing the original list pointer 324*a* with a replacement list pointer 324*b* to a replacement list 304*b* of pointers. The replacement list 304*b* contains data buffer pointers 322 that point to replacement data buffers 168*b*. Thus, original data buffers 168*a* are replaced by replacement data buffers 168*b*, in this embodiment. The replacement data buffers 168*b* could be anywhere in host memory 160. In one embodiment, the replacement data buffers 168*b* are in the region of host memory that was allocated to memory controller 122 as the HMB 170. In this case, the replacement list 304*b* may be a list of HMB pointers 172. However, the replacement data buffers 168*b* are not required to be in the region of host memory 160 that was allocated to memory controller 122 as the HMB 170. It follows that the replacement list 304*b* is not required to be a list of HMB pointers 172.

Note that the data buffer pointers in the original list 304*a* still point to the original data buffers 168*a* after step 604 (see also, FIG. 6C). Furthermore, note that at some point, the memory controller 122 may fetch the data buffer pointers in the original list 304*a*, such that the memory controller 122 may use those original data buffer pointers for another purpose (such as for another host command 320). Also note that no changes are needed to the data buffer pointers in the replacement list 304*b* to implement step 604.

In one embodiment, memory controller 122 modifies the host command 320 that is on the command submission queue 162 in step 604. With reference to FIG. 3A, the memory controller may modify list pointer 324(1). The list pointer 324 that is modified need not be in the host command 320. In one embodiment, the list pointer is in a list 304. For example, the memory controller may modify list pointer 324(2) and/or list pointer 324(3), with reference to FIG. 3A.

Note that at some point the memory controller 122 populates the replacement data buffers 168*b* with data, in one embodiment. However, this could happen prior to or after process 600. For example, one reason why the replacement data buffers 168*b* may have been selected was that they already contained the data needed to respond to a read command. For example, the data to respond to a read command might have been cached in the HMB 170, in which case the replacement data buffers 168*b* would have been populated prior to process 600.

Note that step 602 can be performed for each list pointer 324 associated with the command. Step 606 may be performed for any list pointers 324 that are not to be replaced. In step 606, the original list pointer (and original data buffers) are used. Step 606 is one embodiment of step 414 in process 400.

Figure 7A:
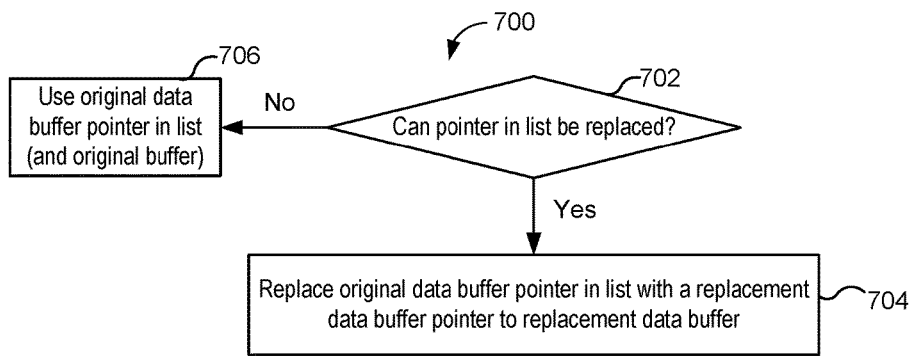
FIGS. 7A, 7B, and 7C depict one embodiment of replacing original data buffer pointers in a list of pointers with replacement data buffer pointers.
Figure 7B:
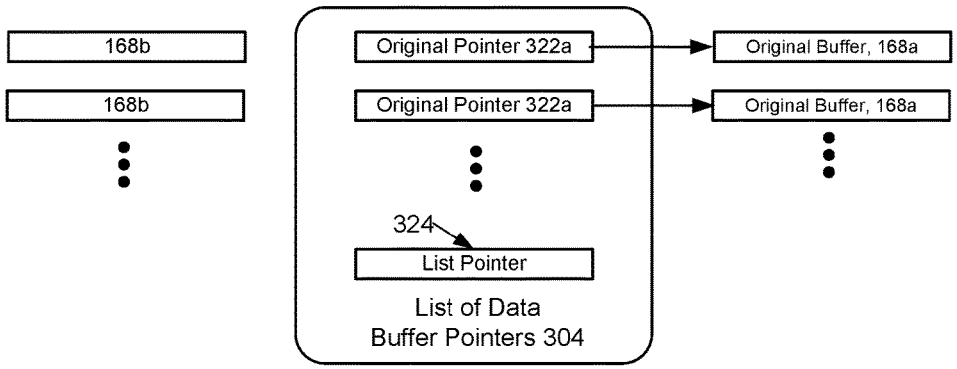
Figure 7C:
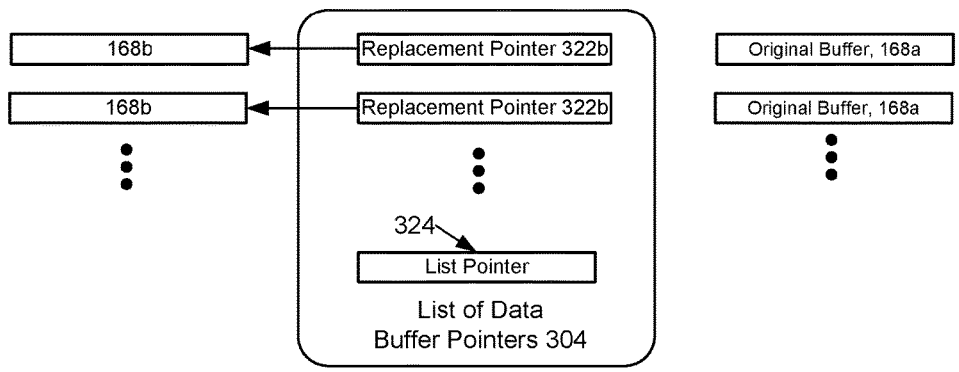

In one embodiment, the data buffer pointer replacement is achieved by replacing one or more data buffer pointers 322 in a list 304 of data buffer pointers. Note that to "replace one or more data buffer pointers 322" the memory controller 122 changes information in memory that stores the one or more data buffer pointers 322. FIGS. 7A-7C depict one embodiment of replacing one or more original data buffer pointers 322*a* in a list 304 of data buffer pointers with one or more replacement data buffer pointers 322*b*. FIG. 7A is a flowchart of one embodiment of a process 700 of replacing one or more data buffer pointers 322 in a list 304. The process 700 may be used for some steps (e.g., 406, 408, 410, and 414) of process 400. The process 700 could be performed separately for each pointer in a list. FIGS. 7B and 7C each depict a list 304 of data buffer pointers 322. In this embodiment, the location of the list 304 does not change. For example, the lists 304 in FIGS. 7B and 7C may occupy the same location in host memory 160. However, the content of the two lists in FIGS. 7B and 7C are different in this embodiment.

FIG. 7B depicts the list 304 as it was when a read command is received in step 402 of process 400. Thus, FIG.

7B depicts the list 304 that the memory controller 122 may access from host memory 160.

Step 702 includes a determination of whether an original data buffer pointer in the list 304 can be replaced. This may be based in part on whether the original data buffer 168*a* can be replaced with a replacement data buffer. Step 702 is one embodiment of step 406 in process 400. The memory controller 122 may determine whether the original data buffer pointer in the list 304 can be replaced based on factors already discussed in step 406. Further details of embodiments of making this determination are discussed below with respect to FIG. 8A (see for example step 804), FIG. 9 (see for example steps 904 and 906); and FIG. 10 (see for example step 1004).

Step 704 is performed if the original data buffer pointer can be replaced. Step 704 is one embodiment of steps 408 and 410 in process 400. With reference to FIGS. 7B and 7C, step 704 may include replacing the original data buffer pointer 322*a* with a replacement data buffer pointer 322*b*. Each replacement data buffer pointer 322*b* points to a replacement data buffer 168*b*. Thus, original data buffers 168*a* are replaced by replacement data buffers 168*b*, in this embodiment. The replacement data buffers 168*b* could be anywhere in host memory 160. In one embodiment, the replacement data buffers 168*b* are in the region of host memory that was allocated to memory controller 122 as the HMB 170. In this case, the replacement data buffer pointers 322*b* may be HMB pointers 172. However, the replacement data buffer pointers 322*b* are not required to be HMB pointers 172. Also, the replacement data buffers 168*b* are not required to be in the region of host memory that was allocated to memory controller 122 as the HMB 170.

Note that at some point the memory controller 122 populates the replacement data buffers 168*b* with data, in one embodiment. However, this could happen prior to or after process 700. For example, one reason why the replacement data buffers 168*b* may have been selected was that they already contained the data needed to respond to a read command. For example, at least some of the data to respond to a read command might have been cached in the HMB 170, in which case the replacement data buffers 168*b* would have been populated prior to process 700.

Note that step 702 can be performed for each original data buffer pointer 322*a* in each list 304 associated with the host command 320. Step 706 may be performed for any original data buffer pointers 322*a* that are not to be replaced. In step 706, the original data buffer pointer 322*a* (and original data buffer 168*a*) are used. Step 706 is one embodiment of step 414 in process 400.

FIG. 8A is a flowchart of one embodiment of a process 800 of replacing original data buffer pointers with replacement data buffer pointers in response to determining data for a read command is cached in host memory. Process 800 may result in replacing original data buffers for a command with replacement data buffers for that command. Process 800 may be used in some of the steps of process 400 (e.g., steps 402, 406, 408, 410, and/or 414). FIG. 8A will be discussed in connection with FIGS. 8B and 8C, which depict usage of host memory 160 and HMB pointers 172 on the non-volatile memory device 100, in one embodiment. Recall that HMB pointers 172 may be stored in volatile or non-volatile memory on the non-volatile memory device 100.

Step 802 includes fetching a read command. This is a command to read at some LBA (for some length), in one embodiment. Thus, a read command may be for some LBA range (wherein the range might include one or more LBAs). The data to be read may be stored in the memory structure 126. Typically, the memory controller 122 translates the LBA to a PBA when the data is stored in the memory structure 126. Note, however, that a copy of the data for at least some of the LBA range could be stored elsewhere than the memory structure 126. For example, a copy of the data could be stored in HMB 170. Note that although an example of LBAs is used, the logical addresses are not limited to blocks. In some cases, the data might be stored in the HMB 170 instead of in the memory structure 126. For example, the memory controller 122 might not have written the data to the memory structure 126 yet. In other cases, there might be a copy of the data in both the memory structure 126 and the HMB 170. Hence, in some cases, the memory controller 122 will not need to read from the memory structure 126 in order to provide data for at least some of the LBA range in the read command. The read command may be fetched from the command submission queue 162. The command submission queue 162 is in host memory 160, in one embodiment. The command submission queue 162 is in RAM 122*b* on the non-volatile memory device 100, in one embodiment. Step 802 is one embodiment of step 402 of process 400.

Step 804 includes determining whether data needed to respond to the read command is already cached in host memory 160. By "data needed to respond to the read command" it is meant data for at least one logical address (e.g., LBA) in the logical address range, in one embodiment. The data might be anywhere in host memory 160. In some cases, the data could be in the HMB 170. In one embodiment, the memory controller 122 examines the starting LBA in field 344 of the read command, as well as the length in field 346 (see, for example, the host command in FIG. 3A). The memory controller 122 may consult management tables 256 to determine whether the data for at least one of the LBAs is cached in HMB 170. Note that the use of LBAs is just one way to manage addresses. The address in the read command need not be an LBA. Step 804 is one embodiment of step 406 of process 400.

Step 806 is to select the data buffer pointers to the cached data as the replacement data buffer pointers. FIG. 8B shows a portion of host memory 160 and a portion of memory on the non-volatile memory device that stores HMB pointers 172 to illustrate. The host memory 160 has data buffers 168, and the HMB 170. Also depicted are data buffer pointers 166. Note that the HMB pointers 172 each point to a data buffer in the host memory 160. Hence, an HMB pointer is an example of a data buffer pointer. Recall that the HMB 170 is a region of the host memory 160 that was allocated to the memory controller 122 for its exclusive use, in one embodiment. This allocation is made when the memory controller 122 was initialized, in one embodiment. The memory controller 122 may be initialized in response to a power on reset of the non-volatile memory device 100. Step 806 is one embodiment of step 408 of process 400.

FIG. 8B shows the original data buffer pointers 322*a*, which point to the original data buffers 168*a*. In other words, at least a portion of the data for the read command is to be transferred by the memory controller 122 to original data buffers 168*a*. For example, the data for a certain LBA range is to be transferred to original data buffers 168*a*. The memory controller 122 has determined that the data for that LBA range is cached in the HMB 170 (cached data 868). The cached data is pointed to by HMB pointers 822*a* (which may be a set of the HMB pointers 172 on the non-volatile memory device 100). Thus, the memory controller 122 determines that HMB pointers 822*a* may be used as the replacement data buffer pointers.

Referring again to FIG. 8A, step 808 is to replace the original data buffer pointers with the data buffer pointers to the cached data in the host memory. In one embodiment, step 808 includes replacing the original pointers with HMB pointers 822a. Step 808 is one embodiment of step 410 of process 400.

Step 810 is to replace the data buffer pointers to the cached data with the original data buffer pointers. FIG. 8C depicts results after one embodiment of step 810. FIG. 8C shows reference numerals 822a and 322a in parenthesis to show how pointers from FIG. 8B may be physically copied to new locations. The original data buffer pointers 322a have been replaced with replacement data buffer pointers 322b. The replacement data buffer pointers 322b point to the replacement data buffers 168b. The replacement data buffers 168b contain the cached data. Thus, the replacement data buffers 168b in FIG. 8C are the same buffers as the cached data 868 in FIG. 8B.

FIG. 8C also shows that the original HMB pointers 822a have been replaced with replacement HMB pointers 822b. The replacement HMB pointers 822b point to data buffers 170a. Note that data buffers 170a may now be considered to be a part of the HMB 170. Thus, note that the HMB 170 now contains data buffers 170a, 170b, and 170c. Moreover, note that data buffers 170a are physically located outside of the region originally allocated to the memory controller 122. In one embodiment, the host system 140 will treat the replacement HMB pointers 822b as pointers to the HMB 170. In other words, data buffers 170a, 170b, and 170c are now for the exclusive use of the memory controller 122, in one embodiment. Thus, the location of the HMB 170 is dynamic, in one embodiment. However, note that the location of the HMB pointers 172 is static, in one embodiment.

Returning again to the discussion of step 804 in FIG. 8A, if data for the present read command is not cached in host memory, then step 812 may be performed. In step 812, the original data buffer pointers are used. Note that for a given read command it is possible that step 812 will be performed for some data buffers, and steps 806-810 for other data buffers. Step 812 is one embodiment of step 414 of process 400.

Note that process 800 may result in some fragmentation of the HMB 170. Also, process 800 may be performed multiple times. In one embodiment, at some point there is a switch in ownership of the data buffers back to the original ownership. For example, at some point the data buffer pointers in HMB pointers 172 can be restored to the state in FIG. 8B, in which all of the data buffer pointers in HMB pointers 172 point to the HMB 170 in FIG. 8B (note that HMB 170 in FIG. 8B refers to the region that was allocated to the memory controller 122 at initialization, in one embodiment). This switchover need not be done in an atomic way (e.g., the pointers in HMB pointers 172 do not all have to be replaced to the original pointer at the same time).

FIG. 9 is a flowchart of one embodiment of a process 900 of replacing original data buffer pointers with replacement data buffer pointers in response to determining that there is an outstanding command having suitable replacement data buffer pointers. Process 900 may result in replacing original data buffers for a command (e.g., read command) with replacement data buffers for that command. Process 900 may be used in some of the steps of process 400 (e.g., steps 402, 406, 408, 410, and/or 414).

Step 902 includes fetching a read command. This is a command to read at some logical address (e.g., LBA) for some length, in one embodiment. The data to be read may be stored in the memory structure 126. Note, however, that a copy of the data for at least a portion of the LBA range could be stored elsewhere than the memory structure 126. For example, a copy of the data could be cached in data cache 266 in non-volatile memory device 100. In some cases, the data might be stored in the data cache 266 instead of in the memory structure 126. For example, the memory controller 122 might not have written the data to the memory structure 126 yet. In other cases, there might be a copy of the data in both the memory structure 126 and the data cache 266. Hence, in some cases, the memory controller 122 will not need to read from the memory structure 126 in order to provide the data for some portion of the LBA range. The read command may be fetched from the command submission queue 162. The command submission queue 162 is in host memory 160, in one embodiment. The command submission queue 162 is in RAM 122b on the non-volatile memory device 100, in one embodiment. Step 902 is one embodiment of step 402 of process 400.

Step 904 includes determining whether data needed to respond to the read command is in data cache 266. In one embodiment, the memory controller 122 examines the starting LBA in field 344 of the read command, as well as the length in field 346 (see, for example, the host command in FIG. 3A). The memory controller 122 may consult management tables 256 to determine whether the data for some portion of the LBA range is in data cache 266.

Step 906 is a determination of whether there is an outstanding read command that can provide replacement data buffer pointers. In one embodiment, the memory controller 122 examines an internal command queue to determine whether there is a read command that is waiting to execute, but for which data buffer pointers have already been fetched. In one embodiment, waiting to execute means that the command executer 228 has not yet sent the read command to the memory interface 230. For example, after the memory controller 122 fetches read commands from the command submission queue 162, the memory controller may add the read commands to an internal queue. While the commands are on the internal queue, the memory controller 122 may fetch the data buffer pointers for the commands. Thus, there may be several read commands for which data buffer pointers have already been fetched, but that are waiting to execute. Together, steps 904 and 906 are one embodiment of step 406 of process 400.

Step 908 includes the memory controller 122 selecting data buffer pointers for the outstanding read command as the replacement data buffer pointers. Note that the any subset of the data buffer pointers may be selected. Step 908 is one embodiment of step 408 of process 400.

Step 910 includes replacing data buffer pointers for the present read command with the replacement data buffer pointers. A variety of replacement techniques could be used. Step 910 could include performing any combination of process 500, 600 and/or 700. Thus, step 910 may include, but is not limited to, replacing an original data buffer pointer 322a in a host command 320 with a replacement data buffer pointer 322b (see, for example, FIGS. 5B and 5C); replacing an original list pointer 324a (which might or might not be in a host command 320) with a replacement list pointer 324b (see, for example, FIGS. 6B and 6C); and/or replacing an original data buffer pointer 322a in a list 304 with a replacement data buffer pointer 322b (see, for example, FIGS. 7B and 7C). Step 910 is one embodiment of step 410 of process 400.

Step 912 includes populating the replacement data buffers with the cached data. Step 910 may include the DMA logic 253 performing a DMA from the data cache 266 to data buffers in the host memory 160. The data buffers are those from the outstanding command that is waiting to execute. With respect to the embodiment of FIGS. 5A-5C, step 912 may include populating replacement data buffer 168b in FIG. 5C with data from the data cache 266. With respect to the embodiment of FIGS. 6A-6C, step 912 may include populating replacement data buffers 168b in FIG. 6C with data from the data cache 266. With respect to the embodiment of FIGS. 7A-7C, step 912 may include populating replacement data buffers 168b in FIG. 7C with data from the data cache 266. Step 912 is one embodiment of step 412 of process 400.

Step 914 includes indicating to the host system 140 that the present read command is complete. In one embodiment, the memory controller 122 writes to the command completion queue 164. The host may go to an entry in the command completion queue 164 for the present read command to determine the location of the data buffer pointers for the present read command. The host will be able to locate the replacement data buffer pointers, and thus be able to access the replacement data buffers.

Step 916 includes fetching the original data buffer pointers for the present read command. Note that step 916 may be performed at an earlier stage of process 900. For example, step 916 might be performed any time after the present read command is fetched. The original data buffer pointers may be stored in storage 251.

Step 918 includes using the original data buffer pointers for the command that provided the replacement data buffer pointers. For example, at some point, the command that was waiting to execute will be executed to return data from the memory structure 126. The memory controller 122 may replace the data buffers pointers for that command with the original data buffer pointers from the command that was accessed in step 902. The memory controller may populate the original data buffers with the data for the command that was waiting to execute. Thus, in effect, the memory controller 122 may swap data buffers for the two commands. However, note that it is not required that a swap of data buffers be performed. Rather, the original data buffers for the command in step 902 might be used for some other read command.

Returning again to step 904, in some cases there will not be cached data for the present command. In this case, one option is to use the original data buffer pointers (in step 920).

Returning again to step 906, in some cases there will not be an outstanding command for replacement data buffer pointers. In this case, one option is to use the original data buffer pointers (in step 920).

Recall that it is possible for there to be an offset to a data buffer. Referring to FIG. 3B, for example, the data buffer pointer 322 in the host command 320 could have a non-zero offset. This means that the first data buffer 168(0) could, in effect, be smaller than the other data buffers 168(1) to 168(24). This may complicate data transfer between the host memory 160 and the non-volatile memory device 100. For example, this may result data buffers in the non-volatile memory device 100 being unaligned with the data buffers 168(0) to 168(24).

FIG. 10 is a flowchart of one embodiment of a process 1000 of replacing an original data buffer pointer with a replacement data buffer pointer in response a data buffer pointer in the host command 320 having a non-zero offset. Process 1000 may simply data transfer when a data buffer pointer in the host command 320 has a non-zero offset. FIG. 10 provides further details of one embodiment of process 400. Step 1002 includes fetching a host command 320. Step 1002 is one embodiment of step 402 of process 400.

Step 1004 is a determination of whether there is a data buffer offset in the host command 320. With reference to FIG. 3B as one example, the memory controller 122 determines whether offset 323 is non-zero. If not, then one option is to use the original data buffer pointers in step 1012. Note that the original data buffer pointers still could be replaced by performing another process such as process 800 or process 900. Step 1004 is one embodiment of step 406 of process 400.

In the event that there is a non-zero offset, then control passes to step 1006. Step 1006 includes selecting a data buffer pointer to replace the data buffer pointer 322 in the host command 320. This data buffer pointer could be one of the HMB pointers 172 or be one of the other data buffer pointers 166. The selection may include finding a data buffer having an alignment that matches buffer 168(0). Step 1006 is one embodiment of step 408 of process 400.

Step 1008 includes replacing the original data buffer pointer in the host command 320 with the replacement data buffer pointer. FIGS. 5B and 5C depict one example of such a replacement. Step 1008 is one embodiment of step 410 of process 400.

Process 1000 may result in a more efficient transfer of data between the host system 140 and non-volatile memory device 100. For example, process 1000 may result in aligned data transfers for data buffers 168(1) to 168(24), with reference to the example of FIG. 3B. In other words, the data buffers in the non-volatile memory device 100 may be aligned with data buffers 168(1) to 168(24), which results in an efficient data transfer.

A first embodiment disclosed herein includes an apparatus comprising non-volatile memory; a communication interface configured to communicate with a host; and a memory controller coupled to the non-volatile memory and the communication interface. The memory controller is configured to control access by the host to the non-volatile memory via the communication interface. The memory controller is configured to access a read command. The read command is associated with an original data buffer pointer to an original data buffer in host memory of the host. The memory controller is configured to replace the original data buffer pointer with a replacement data buffer pointer to a replacement data buffer in the host memory. The memory controller is configured to populate the replacement data buffer with data. The memory controller is configured to indicate a command completion for the read command to the host after the original data buffer pointer has been replaced by the replacement data buffer pointer.

In a second embodiment, in furtherance of the first embodiment, the memory controller is further configured to replace the original data buffer pointer with the replacement data buffer pointer in response to a determination that the data in the replacement data buffer is data needed to respond to the read command.

In a third embodiment, in furtherance of the first embodiment, the memory controller is further configured to replace the original data buffer pointer with the replacement data buffer pointer in response to a determination that there is another read command waiting to be executed and for which the replacement data buffer pointer has already been obtained.

In a fourth embodiment, in furtherance of the first embodiment, the memory controller is configured to replace the original data buffer pointer with the replacement data buffer pointer in response to the original data buffer pointer having an offset.

In a fifth embodiment, in furtherance of any of the first to fourth embodiments, the memory controller is configured to replace the original data buffer pointer in the read command with the replacement data buffer pointer in response to the original data buffer pointer being in the read command.

In a sixth embodiment, in furtherance of any of the first to fourth embodiments, the memory controller is configured to replace at least the original data buffer pointer in a list pointed to by a list pointer the read command with the replacement data buffer pointer in response to the original data buffer pointer being in the list.

In a seventh embodiment, in furtherance of any of the first to fourth embodiments, the memory controller is configured to replace an original list pointer with a replacement list pointer to a replacement list of data buffer pointers in response to the original data buffer pointer being in an original list of data buffer pointers pointed to by the original list pointer.

In an eighth embodiment, in furtherance of any of the first to seventh embodiments, wherein to replace the original data buffer pointer with the replacement data buffer pointer the memory controller is configured to replace a copy of the original data buffer pointer that resides in the host memory with the replacement data buffer pointer.

In a ninth embodiment, in furtherance of any of the first to seventh embodiments, wherein to replace the original data buffer pointer with the replacement data buffer pointer the memory controller is configured to replace a copy of the original data buffer pointer that resides in memory on the memory controller side of the communication interface that is accessible to the host with the replacement data buffer pointer.

In a tenth embodiment, in furtherance of any of the first to ninth embodiments, the read command contains a logical address; the memory controller is configured to determine whether data for the logical address is cached in volatile memory; and the memory controller is configured to provide the cached data to respond to the read command when the data for the logical address is cached in the volatile memory.

One embodiment includes a method of operating a memory device having non-volatile memory. The method comprises accessing, by a memory controller that is configured to control access of a host to the non-volatile memory via a communication interface, a read command having a range of logical addresses. The read command is associated with a set of original data buffers in host memory in the host at which data for the range of logical addresses is to be stored by the memory controller. The method further includes determining to use one or more replacement data buffers in the host memory instead of a corresponding one or more of the original data buffers. The method further includes transferring data for at least one logical address from the memory device to the one or more replacement data buffers. The method further includes indicating, by the memory controller, that the data for the at least one logical address has been stored in the one or more replacement data buffers instead of the corresponding one or more original data buffers.

One embodiment includes a memory device, comprising: non-volatile memory; and communication means for receiving commands from a host to access the non-volatile memory. The memory device further comprises command access means for accessing a read command having a logical address and a length. The read command is associated with a range of logical addresses. The read command is associated with a set of original data buffer pointers to a set of original data buffers in host memory of the host at which data for the range of logical addresses is to be stored by the memory device. The memory device further comprises pointer management means for replacing at least one original data buffer pointer in the set of original data buffer pointers with a set of replacement data buffer pointers to a set of replacement data buffers in the host memory. The memory device further comprises data transfer means for performing a direct memory access to populate the set of replacement data buffers with data for at least one logical address in the range of logical addresses. The memory device further comprises command response means for indicating a command completion for the read command to the host after the pointer management means has replaced the at least one original data buffer pointer with the set of replacement data buffer pointers and after the data transfer means has performed the direct memory access.

In one embodiment, the command access means comprises one or more of front end module 208, PHY 222, processor 122c, interface 120, host queue manager 246, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the command access means could include other hardware and/or software.

In one embodiment, the pointer management means comprises one or more of host pointer manager 250, processor 122c, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the pointer management means could include other hardware and/or software.

In one embodiment, the data transfer means comprises one or more of DMA logic 253, processor 122c, PHY 222, interface 120, host queue manager 246 an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the data transfer means could include other hardware and/or software.

In one embodiment, the command response means comprises one or more of host queue manager 246, processor 122c, PHY 222, interface 120, host queue manager 246, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the command response means could include other hardware and/or software.

One embodiment includes a memory device, comprising non-volatile memory; a communication interface configured to transfer data read from the non-volatile memory to requestor memory of a requestor; and one or more control circuits in communication with the non-volatile memory and the communication interface. The one or more control circuits are configured to access a read command that has a logical address and a length. The read command is associated with a range of logical addresses. The read command is associated with a set of original data buffer pointers to a set of original data buffers in the requestor memory at which data for the range of logical addresses is to be stored by the memory device. The one or more control circuits are further configured to replace at least one original data buffer pointer in the set of original data buffer pointers with a corresponding at least one replacement data buffer pointer to at least one replacement data buffer in the requestor memory. The one or more control circuits are further configured to transfer data for at least one logical address in the range of logical addresses to the at least one replacement data buffer. The one or more control circuits are further configured to instruct the requestor to use the at least one replacement data buffer pointer instead of the at least one original data buffer pointer to obtain the data for at least one logical address in the range.

Corresponding methods, systems and computer- or processor-readable storage devices which have executable code for performing the methods provided herein may also be provided.

For the purpose of this document, the numeric terms first (i.e., $1^{st}$) and second (i.e., $2^{nd}$) may be used to generally specify an order of when commands (e.g., write commands) are received by a memory controller from a host, as well as to generally specify an order in which data (e.g., $1^{st}$ and $2^{nd}$ data) is to be stored in non-volatile memory. However, it is noted that the term first (i.e., $1^{st}$) should not be interpreted as implying that nothing else precedes it.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the terms "based on" and "in dependence on" may be read as "based at least in part on."

For purposes of this document, a "set" may include one or more elements.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

We claim:

1. An apparatus comprising:
non-volatile memory;
a communication interface configured to communicate with a host; and
a memory controller coupled to the non-volatile memory and the communication interface, the memory controller configured to control access by the host to the non-volatile memory via the communication interface, the memory controller being configured to:
access a read command, the read command associated with an original data buffer pointer to an original data buffer in host memory of the host;
replace the original data buffer pointer with a replacement data buffer pointer to a replacement data buffer in the host memory;
populate the replacement data buffer with data; and
indicate a command completion for the read command to the host after the original data buffer pointer has been replaced by the replacement data buffer pointer.

2. The apparatus of claim 1, wherein the memory controller is further configured to:
replace the original data buffer pointer with the replacement data buffer pointer in response to a determination that the data in the replacement data buffer is data needed to respond to the read command.

3. The apparatus of claim 1, wherein the memory controller is further configured to:
replace the original data buffer pointer with the replacement data buffer pointer in response to a determination that there is another read command waiting to be executed and for which the replacement data buffer pointer has already been obtained.

4. The apparatus of claim 1 wherein the memory controller is configured to replace the original data buffer pointer with the replacement data buffer pointer in response to the original data buffer pointer having an offset.

5. The apparatus of claim 1 wherein the memory controller is configured to replace the original data buffer pointer in the read command with the replacement data buffer pointer in response to the original data buffer pointer being in the read command.

6. The apparatus of claim 1 wherein the memory controller is configured to replace at least the original data buffer pointer in a list pointed to by a list pointer in the read command with the replacement data buffer pointer in response to the original data buffer pointer being in the list.

7. The apparatus of claim 1 wherein the memory controller is configured to replace an original list pointer with a replacement list pointer to a replacement list of data buffer pointers in response to the original data buffer pointer being in an original list of data buffer pointers pointed to by the original list pointer.

8. The apparatus of claim 1 wherein, to replace the original data buffer pointer with the replacement data buffer pointer, the memory controller is configured to replace a copy of the original data buffer pointer that resides in the host memory with the replacement data buffer pointer.

9. The apparatus of claim 1 wherein, to replace the original data buffer pointer with the replacement data buffer pointer, the memory controller is configured to replace a copy of the original data buffer pointer that resides in memory on the memory controller side of the communication interface that is accessible to the host with the replacement data buffer pointer.

10. The apparatus of claim 1 wherein:
the read command contains a logical address;
the memory controller is configured to determine whether data for the logical address is cached in volatile memory; and
the memory controller is configured to provide the data for the logical address that is cached in volatile memory to respond to the read command when the data for the logical address is cached in the volatile memory.

11. A method of operating a memory device having non-volatile memory, the method comprising:
accessing, by a memory controller that is configured to control access of a host to the non-volatile memory via a communication interface, a read command having a range of logical addresses, the read command associated with a set of original data buffers in host memory in the host at which data for the range of logical addresses is to be stored by the memory controller;
determining to use one or more replacement data buffers in the host memory instead of a corresponding one or more of the original data buffers;
transferring data for at least one logical address from the memory device to the one or more replacement data buffers; and
indicating, by the memory controller, that the data for the at least one logical address has been stored in the one or more replacement data buffers instead of the corresponding one or more original data buffers.

12. The method of claim 11, wherein the memory controller determines that the data that is to be stored in the one or more original data buffers can be stored in the one or more replacement data buffers in response to:
determining that the data in the one or more replacement data buffers is the data for the at least one logical address in the range of logical addresses, wherein the one or more replacement data buffers are in a region of the host memory that was allocated for exclusive use of the memory controller.

13. The method of claim 12, further comprising:
releasing the one or more replacement data buffers to the host, wherein the one or more replacement data buffers are no longer for the exclusive use of the memory controller.

14. The method of claim 11, wherein the memory controller determines that the data that is to be stored in the one or more original data buffers can be stored in the one or more replacement data buffers in response to:
determining that the one more replacement data buffers are available to the memory controller for use with a different read command that is waiting to execute to access the non-volatile memory.

15. The method of claim 11, wherein the memory controller transfers the data for the at least one logical address in the range of logical addresses from the memory device to the one or more replacement data buffers prior to the memory controller accessing the read command.

16. The method of claim 11, further comprising the memory controller replacing one or more original data buffer pointers to the one or more original data buffers with a corresponding one or more replacement data buffer pointers to the one or more replacement data buffers.

17. The method of claim 16, wherein the memory controller replacing the one or more original data buffer pointers with the one or more replacement data buffer pointers comprises the memory controller:
replacing a copy of the one or more original data buffer pointers that resides in the host memory with the corresponding one or more replacement data buffer pointers.

18. The method of claim 16, wherein the memory controller replacing the one or more original data buffer pointers with the one or more replacement data buffer pointers comprises the memory controller:
replacing a copy of the one or more original data buffer pointers that resides in memory on the memory controller side of the communication interface that is accessible to the host with the corresponding one or more replacement data buffer pointers.

19. The method of claim 16, wherein the memory controller replacing the one or more original data buffer pointers with the one or more replacement data buffer pointers comprises the memory controller:
replacing one or more original Non-volatile Memory Express (NVMe) Physical Region Page (PRP) entries with one or more replacement NVMe PRP entries.

20. A memory device, comprising:
non-volatile memory;
communication means for receiving commands from a host to access the non-volatile memory;
command access means for accessing a read command having a logical address and a length, the read command being associated with a range of logical addresses, the read command associated with a set of original data buffer pointers to a set of original data buffers in host memory of the host at which data for the range of logical addresses is to be stored by the memory device;
pointer management means for replacing at least one original data buffer pointer in the set of original data buffer pointers with a set of replacement data buffer pointers to a set of replacement data buffers in the host memory;
data transfer means for performing a direct memory access to populate the set of replacement data buffers with data for at least one logical address in the range of logical addresses; and
command response means for indicating a command completion for the read command to the host after the pointer management means has replaced the at least one original data buffer pointer with the set of replacement data buffer pointers and after the data transfer means has performed the direct memory access.

21. A memory device, comprising:
non-volatile memory;
a communication interface configured to transfer data read from the non-volatile memory to requestor memory of a requestor; and
one or more control circuits in communication with the non-volatile memory and the communication interface, the one or more control circuits configured to:
access a read command, the read command having a logical address and a length, the read command being associated with a range of logical addresses, the read command associated with a set of original data buffer pointers to a set of original data buffers in the requestor memory at which data for the range of logical addresses is to be stored by the memory device;
replace at least one original data buffer pointer in the set of original data buffer pointers with a corresponding at least one replacement data buffer pointer to at least one replacement data buffer in the requestor memory;

transfer data for at least one logical address in the range of logical addresses to the at least one replacement data buffer; and instruct the requestor to use the at least one replacement data buffer pointer instead of the at least one original data buffer pointer to obtain the data for the at least one logical address in the range.

22. The memory device of claim 21, wherein the one or more control circuits configured to are further configured to:

determine whether the data for the at least one logical address in the range of logical addresses is cached in a region of the requestor memory that was allocated for exclusive use of the one or more control circuits; and replace the at least one original data buffer pointer with the at least one replacement data buffer pointer in response to a determination that the data for the at least one logical address in the range of logical addresses is cached in the region of the requestor memory that was allocated for exclusive use of the one or more control circuits, wherein the at least one replacement data buffer pointer points to the cached data.

23. The memory device of claim 21, wherein the one or more control circuits configured to are further configured to:

determine whether a different read command for which data buffer pointers have already been obtained is waiting to execute to access the non-volatile memory; and use the data buffer pointers for the different read command as the at least one replacement data buffer pointer.

* * * * *